(12) United States Patent
Panz et al.

(10) Patent No.: US 7,767,180 B2
(45) Date of Patent: Aug. 3, 2010

(54) PRECIPITATED SILICAS HAVING SPECIAL SURFACE PROPERTIES

(75) Inventors: Christian Panz, Wesseling-Berzdorf (DE); Helga Obladen, Bruehl (DE); Rene Allerdisse, Bornheim (DE); Karl Meier, Alfter (DE); Markus Ruf, Alfter-Witterschlick (DE); Michael Kempf, Rodenbach (DE); Mario Scholz, Gruendau (DE); Dieter Kuhn, Rodenbach (DE)

(73) Assignee: Degussa GmbH, Duesseldorf (DE)

( * ) Notice: Subject to any disclaimer, the term of this patent is extended or adjusted under 35 U.S.C. 154(b) by 520 days.

(21) Appl. No.: 11/754,930

(22) Filed: May 29, 2007

(65) Prior Publication Data

US 2007/0286788 A1   Dec. 13, 2007

(30) Foreign Application Priority Data

| May 26, 2006 | (DE) | ............ 10 2006 024 591 |
| Oct. 16, 2006 | (DE) | ............ 10 2006 048 850 |
| Jan. 31, 2007 | (DE) | ............ 10 2007 004 757 |

(51) Int. Cl.
*C01B 33/12* (2006.01)
*B60C 1/00* (2006.01)

(52) U.S. Cl. .............. 423/339; 423/335; 524/492; 524/493

(58) Field of Classification Search ............. 423/335, 423/339; 524/492, 493
See application file for complete search history.

(56) References Cited

U.S. PATENT DOCUMENTS 5,004,869 A   4/1991   Koblitz et al.

| 5,256,196 | A  | 10/1993 | Chjonowski et al. |
| 5,321,070 | A  | 6/1994  | Meier et al. |
| 5,851,502 | A  | 12/1998 | Turk et al. |
| 6,077,466 | A  | 6/2000  | Turk et al. |
| 6,191,122 | B1 | 2/2001  | Lux et al. |
| 6,846,865 | B2 | 1/2005  | Panz et al. |
| 6,899,951 | B2 | 5/2005  | Panz et al. |
| 6,956,080 | B2 | 10/2005 | Scholz et al. |
| 7,022,375 | B2 | 4/2006  | Schachtely et al. |
| 7,074,457 | B2 | 7/2006  | Panz et al. |
| 7,204,969 | B2 | 4/2007  | Kuhlmann et al. |
| 7,220,449 | B2 | 5/2007  | Schachtely et al. |
| 2005/0191228 | A1 | 9/2005 | Panz et al. |
| 2005/0192395 | A1 | 9/2005 | Panz et al. |

(Continued)

FOREIGN PATENT DOCUMENTS

DE   879 834   6/1953

(Continued)

OTHER PUBLICATIONS

A. J. McFarlan and B. A. Morrow, "Infrared Evidence for Two Isolated Silanol Species on Activated Silicas," J. Phys. Chem. (1991) 95, pp. 5388-5390.*

(Continued)

*Primary Examiner*—Timothy C Vanoy
*Assistant Examiner*—Diana J Liao
(74) *Attorney, Agent, or Firm*—Oblon, Spivak, McClelland, Maier & Neustadt, L.L.P.

(57) ABSTRACT

Precipitated silicas having an $SiOH_{isolated}$ absorbance ratio of greater than or equal to 1, may be used as reinforcers and thickeners for sealants.

30 Claims, 9 Drawing Sheets

U.S. PATENT DOCUMENTS

2005/0282934 A1 12/2005 Brinkmann et al.
2007/0286788 A1 12/2007 Panz et al.
2008/0173739 A1 7/2008 Meier et al.

FOREIGN PATENT DOCUMENTS

EP 0 901 986 A1 3/1999

OTHER PUBLICATIONS

J. P. Gallas, J. C. Lavalley, A. Burneau and 0. Barres, "Comparative Study of the Surface Hydroxyl Groups of Fumed and Precipitated Silicas. 4 Infrared Study of Dehydroxylation by Thermal Treatments," Langmuir (1991), 7, pp. 1235-1240.*
U.S. Appl. No. 12/262,684, filed Oct. 31, 2008, Panz, et al.
U.S. Appl. No. 11/944,851, filed Nov. 26, 2007, Panz, et al.
U.S. Appl. No. 60/021,601, filed Jul. 11, 1996, Oelmueller, et al.
U.S. Appl. No. 09/447,044, filed Nov. 23, 1999, Turk, et al.
U.S. Appl. No. 08/683,342, filed Jul. 18, 1996, Rausch, et al.
U.S. Appl. No. 60/940,615, filed May 29, 2007, Meier, et al.
U.S. Appl. No. 60/985,809, filed Nov. 6, 2007, Panz, et al.
U.S. Appl. No. 11/754,915, filed May 29, 2007, Panz, et al.

* cited by examiner

|  | STANDARD DUMBBELL | | | |
|---|---|---|---|---|
|  | S1 | S2 | S3 | S3A |
| Total length, minimum $l$ | 115 | 75 | 35 | 50 |
| Width of ends $b_k$ | 25 | 12.5 | 6 | 8.5 |
| Length of bridge $l_s$ | 33 | 25 | 12 | 15 |
| Width of bridge $\pm 0.05$ | 6 | 4 | 2 | 4 |
| Transition radius, internal $r_1$ | 25 | 12.5 | 2.2 | 0 |
| Transition radius, external $r_2$ | 14 | 8 | 2.2 | 10 |
| Thickness $a$ | 1.5 to 3.0 | 1.5 to 3.0 | 1.5 to 3.0 | 1.5 to 3.0 |
| Preferred dimensions | 2.0 | 2.0 | 1.0 | 2.0 |
| Measurement length $L_0$ | 25 | 20 | 10 | 10 |

| DIMENSION | MILLIMETERS | |
|---|---|---|
| | SIZE | TOLERANCE |
| A | 110 | ±0.50 |
| B | 68 | ±0.50 |
| C | 45 | ±0.50 |
| D | 25 | ±0.50 |
| E | 43 | ±0.50 |
| F | 12.5 | ±0.50 |
| G | 10.2 | ±0.50 |
| H | 9 | ±0.50 |
| J | 7.5 | ±0.50 |
| INCISION | 0.5 | ±0.50 |

PRECIPITATED SILICAS HAVING SPECIAL SURFACE PROPERTIES

BACKGROUND OF THE INVENTION

1. Field of the Invention

The present invention relates to precipitated silicas having special surface qualities, to a process for preparing them and to their use for thickening sealants.

2. Discussion of the Background

Sealants are elastic substances that are applied in liquid to highly viscous form for the sealing of buildings or installations against water, atmospheric influence or aggressive media.

Silicone rubbers are compositions which are convertible into the elastomeric state and comprise as their base polymers polydiorganosiloxanes containing groups amenable to crosslinking reactions. Suitable such groups include, primarily H atoms, OH groups and vinyl groups, which may be located at the chain ends, or else may be incorporated in the chain. Incorporated into this system are fillers as reinforcers, their nature and amount significantly influencing the mechanical and chemical behavior of the vulcanizates. Silicone rubbers can be colored with inorganic pigments. One distinction is between high-temperature vulcanizing and room-temperature vulcanizing (HTV/RTV) silicone rubbers.

Among the room-temperature curing or vulcanizing silicone rubber compositions, it is possible to differentiate one-component (1K) and two-component (2K) systems. The first group (RTV-1K) polymerizes slowly at room temperature under the influence of atmospheric moisture, with crosslinking taking place through condensation of SiOH groups to form Si—O bonds. The SiOH groups are formed by hydrolysis of SiX groups of a species formed as an intermediate from a polymer with terminal OH groups and from what is called a crosslinker R—SiX$_3$ (e.g. =—O—CO—CH$_3$, —NHR). In two-component rubbers (RTV-2K) the crosslinkers used are, for example, mixtures of silicic esters (e.g. ethyl silicate) and organotin compounds, the crosslinking reaction that takes place being the formation of an Si—O—Si bridge from ≡Si—OR and ≡Si—OH (-=methyl group; R=organic radical) by elimination of alcohol.

The thickeners used for RTV-1 K silicone rubber include silicas. In view of the sensitivity to hydrolysis of the silicone sealants, these silicas must introduce as little moisture as possible into the system. For this reason, fumed silicas have been used almost exclusively to date for this application. Hydrophilic silicas have not been used to date, on account of their high moisture content.

WO 2005/061384 shows the preparation and use—including use in silicone rubber—of silicas having a water absorption of <6% by weight and a DOP>300 ml/100 g. The silicas disclosed in the examples of WO 2005/061384, however, all have a water absorption of between 5.7% and 5.9% by weight and are therefore unsuitable for use in RTV-1K formulations. Accordingly, WO 2005/061384 describes only their use in silicone rubber formulations for extrusion processes (HTV).

EP 1557446 describes exclusively HTV silicone rubber formulations. The silicas employed therein have a loss on drying of <4% by weight. The formulations disclosed in EP 1557446 are used for producing insulating materials such as cable sheathing, for example.

In summary, therefore, it can be stated that the background art does not disclose any precipitated silicas which meet the exacting requirements for use in RTV-1K silicone rubber.

There is therefore a strong need for precipitated silicas of this kind that are suitable for RTV-1K applications.

SUMMARY OF THE INVENTION

It is an object of the present invention to provide precipitated silicas from which the abovementioned disadvantages of the precipitated silicas of the background art are completely or at least partially eliminated. A further aim is to provide a process for preparing the silicas of the present invention.

Further objects, not explicitly stated, will emerge from the overall context of the description, examples and claims.

This and other objects have been achieved by the present invention the first embodiment of which includes a precipitated silica having an $SiOH_{isolated}$ absorbance ratio of greater than or equal to 1.

In another embodiment, the present invention relates to a process for preparing a silica as above, comprising:
A) reacting at least one silicate with at least one acidifier, to obtain a silica,
B) filtering and washing the silica, to obtain a washed silica or filter cake,
C) drying the washed silica or filter cake, to obtain a dried silica, and
D) heat-treating the dried silica.

In yet another embodiment, the present invention relates to a method of producing a sealant, comprising:
adding the above precipitated silica to a sealant.

The present invention also relates to sealant, comprising:
at least one precipitated silica as above.

DETAILED DESCRIPTION OF THE INVENTION

Figure 1:
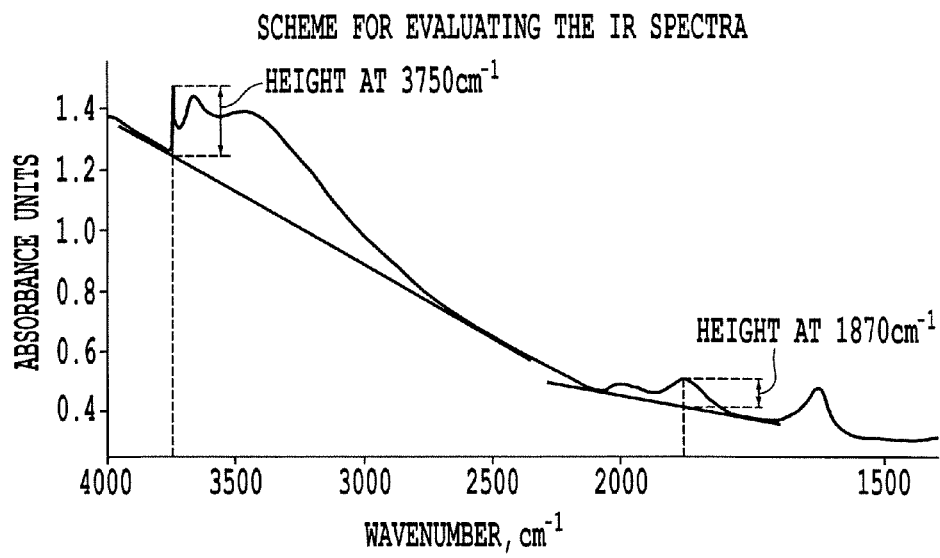
FIG. 1 is a scheme for evaluating IR spectra.

Surprisingly it has been found that this object is achieved by the precipitated silicas of the present invention that are defined in greater detail in the description below and also in the claims and in the examples.

The present invention therefore provides precipitated silicas having an SiOH$_{isolated}$ absorbance ratio of greater than or equal to 1.

The present invention also provides precipitated silicas, preferably hydrophilic precipitated silicas which in addition to the stated parameters, independently of one another, have one or more of the following physicochemical parameters:

| | |
|---|---|
| silanol group density | 0.5-3.5 SiOH/nm$^2$ |
| modified tapped density | <70 g/l |
| BET surface area | 50-600 m$^2$/g |
| CTAB surface area | 50-350 m$^2$/g |
| DBP (anhydrous) | 150-400 g/100 g |
| loss on ignition | 0.1%-3.0% by weight |
| loss on drying | 0.1%-3.0% by weight |
| pH | 4-9 |
| fraction of particles <1 μm in the volume-based particle distribution | 5% to 100% by volume |
| d$_{90}$ value of the volume-based particle distribution | 0.001 to 10 μm. |

The present invention further provides a process for preparing the precipitated silicas of the present invention.

Additionally provided by the present invention is the use of the silicas of the present invention in sealants, especially in silicone rubber and silicone sealants and with particular preference in RTV-1K sealants. Application is possible in different crosslinking systems, e.g. acetoxy-crosslinking, alkoxy-crosslinking and oxime-crosslinking. These systems are employed, for example, in the building industry as joint-sealants, in the automotive industry as adhesives and sealants, and as coating materials for textile fabric, for example.

The present invention further provides sealants based on silicone rubber which comprise the silicas of the present invention, and their use.

The precipitated silicas of the present invention have the advantage that, on the basis of their special structure and surface qualities, they ensure high storage stability, a firm consistency and an optimum yield point of the silicone rubber when incorporated into silicone rubber compositions, especially those of the RTV-1K type.

A further advantage of the precipitated silicas of the present invention is their low modified tapped density. The low modified tapped density comes about as a result of a very loose packing of the silica particles. This means that, although in mutual contact and adhering gently to one another, the silica particles are nevertheless so loosely packed that large cavities are produced. This loose packing comes about in the silicone compound as well and thus contributes to the high level of thixotropy on the part of the silicone compound.

In summation, the particular properties of the precipitated silicas of the present invention lead to advantages which include the following:

high storage stability of RTV-1K silicone rubber compositions following incorporation of the silicas of the present invention;

rapid and effective dispersing and hence high thickening action of the silica in RTV-1K silicone rubber compositions.

Moreover, the precipitated silicas of the present invention offer a substantial cost advantage over the fumed silicas used to date in RTV1 silicone rubber, being more inexpensive to prepare.

The subjects of the present invention are described in detail below.

In the present invention the terms silica and precipitated silica are used synonymously. By hydrophilic precipitated silicas are meant those whose surface shows hydrophilic behavior when incorporated by stirring into water, i.e. those whose surface is completely wetted by water and therefore has a contact angle with respect to water of less than 90°. The hydrophilic precipitated silicas of the present invention preferably have a carbon content of <0.5% by weight.

The silicas of the present invention are distinguished by the fact that they have a particularly high proportion of isolated SiOH groups, as expressed by the SiOH$_{isolated}$ absorbance ratio, on their surface. The SiOH$_{isolated}$ absorbance ratio of the silicas of the present invention is greater than or equal to 1, preferably between 1.5 and 10, more preferably between 1.5 and 7, very preferably between 1.8 and 5, with especial preference between 2 and 4.5, with very special preference between 2.3 and 4.0 and with particular preference between 2.3 and 3.5. The SiOH$_{isolated}$ absorbance ratio of the silicas includes all values and subvalues therebetween, especially including 0.5, 1, 1.5, 2, 2.5, 3, 3.5, 4, 4.5, 5, 5.5, 6, 6.5, 7, 7.5, 8, 8.5, 9 and 9.5 SiOH/nm$^2$. This particular surface quality of the silicas of the present invention is a key property, and means that in silicone rubber formulations the silicas lead to a high level of storage stability, and improved firmness of consistency, and an optimized flow behavior.

Without being tied to any specific theory, the special properties of the silicas of the present invention may be explained by the high number of isolated SiOH groups and at the same time their wide spacing. These two properties make it more difficult for hydrogen bonds to form and for water molecules to accumulate on the silica's surface.

For the abovementioned reasons it may be advantageous if the silicas of the present invention have a low silanol group density, i.e. a broad separation of the silanol groups on the silica surface. For the determination of the silanol group density, the number of silanol groups on the surface of the silica is first determined by means of LiAlH$_4$. This alone, however, is not meaningful, since precipitated silicas with a high surface area generally have a higher absolute number of silanol groups than do precipitated silicas with a low surface area. Consequently it is necessary to relate the number of silanol groups to the surface area of the silica. A suitable surface area for this purpose is the BET surface area, since this describes the surface area which is available even to relatively small molecules such as water, for example. The silanol group density of the silicas of the present invention is situated preferably in the range from 0.5 to 3.5 SiOH/nm$^2$, preferably from 0.5 to 3.0 SiOH/nm$^2$, more preferably from 1.0 to 2.8 SiOH/nm$^2$ and with very particular preference from 1.5 to 2.8 SiOH/nm$^2$. The silanol group density includes all values and subvalues therebetween, especially including 1, 1.5, 2, 2.5 and 3 SiOH/nm$^2$. If the number of silanol groups per nm$^2$ is too low, this may result in an excessively low yield point and may consequently have an adverse effect on the consistency of the silicone sealants.

The specific BET surface area describes the effect of the silica on the incorporation characteristics into silicone rubber and also on the crude mixing properties (cf. S. Brunauer, P. H. Emmett, E. Teller, "Adsorption of Gases in Multimolecular Layers", J. Am. Chem. Soc. 60, 309 (1938)). Thus the silicas of the present invention may have a BET surface area of 50 to 600 m$^2$/g, preferably 50 to 400 m$^2$/g, more preferably 50 to 250 m$^2$/g, very preferably 80 to 230 m$^2$/g, especially of 100 to 180 m$^2$/g, with very especial preference of 125 to 180 m$^2$/g and with particular preference of 140 to 170 m$^2$/g. The specific BET surface area includes all values and subvalues therebetween, especially including 60, 70, 80, 90, 100, 110, 120, 130, 140, 150, 160, 170, 180, 190, 200, 210, 220, 230, 240, 250, 300, 350, 400, 450, 500 and 550 m²/g.

The specific CTAB surface area is of decisive importance primarily for the reinforcing property of the silica (cf. Janzen, Kraus, Rubber Chem. Technol. 44, 1287 (1971)). The reinforcing potential increases with increasing CTAB surface area. Thus the precipitated silicas of the present invention may have a CTAB surface area of 50 to 350 m²/g, more preferably 50 to 250 m²/g, very preferably of 80 to 230 m²/g, especially preferably of 100 to 200 m²/g, with very especial preference of 125 to 190 m²/g and with particular preference of 140 to 190 m²/g. The CTAB surface area includes all values and subvalues therebetween, especially including 60, 70, 80, 90, 100, 110, 120, 130, 140, 150, 160, 170, 180, 190, 200, 210, 220, 230, 240, 250, 260, 270, 280, 290, 300, 310, 320, 330 and 340 m²/g.

It has additionally been found that a high DBP absorption on the part of the silicas of the present invention is of benefit in order to obtain effective theological properties. Excessively high DBP values, however, may lead to an excessive increase in the viscosity of the silicone rubber and ought therefore to be avoided. The silicas of the present invention, accordingly, preferably have a DBP absorption of 150 to 400 g/(100 g), more preferably 200 to 350 g/(100 g), very preferably of 220 to 330 g/(100 g), with especial preference 250 to 330 g/(100 g) and very especially 260 to 320 g/(100 g). The DBP absorption includes all values and subvalues therebetween, especially including 160, 170, 180, 190, 200, 210, 220, 230, 240, 250, 260, 270, 280, 290, 300, 310, 320, 330, 340, 350, 360, 370, 380 and 390 g/(100 g).

In a special embodiment, the precipitated silicas of the present invention have a low modified tapped density and hence a very particularly good thixotropy. It should be noted here that the modified tapped density is a reference to the tapped density as measured on the uncompacted material. In order to be able to determine this variable even on materials which have already undergone preliminary compaction as a result of packaging and storage, it is necessary to carry out sample preparation as described in the section "Determining the modified tapped density". The silicas of the present invention preferably have a modified tapped density of less than or equal to 70 g/l, preferably of 1 to 60 g/l, more preferably of 5 to 55 g/l, very preferably of 10 to 50 g/l, and in particular of 10 to 30 g/l. The modified tapped density includes all values and subvalues therebetween, especially including 5, 10, 15, 20, 25, 30, 35, 40, 45, 50, 55, 60 and 65 g/l.

The inventors have observed, moreover, that for the consistency of the silicone sealants it may be of particular advantage if the precipitated silicas of the present invention contain a sufficient fraction of fine particles, i.e. of particles <1 μm. This applies to all of the embodiments described above. Therefore, the silicas of the present invention in the particle size range <1 μm of the volume-based particle distribution have a fine-particle fraction of preferably 5% to 100% by volume, more preferably 10% to 95% by volume, very preferably 10% to 95% by volume, more preferably 15% to 90% by volume, with especial preference 20% to 90% by volume, with more especial preference 20% to 80% by volume and with particular preference of 50% to 80% by volume. This fine-particle fraction includes all values and subvalues therebetween, especially including 5, 10, 15, 20, 25, 30, 35, 40, 45, 50, 55, 60, 65, 70, 75, 80, 85, 90 and 95% by volume.

It has also been observed that an excessive fraction of coarse particles may adversely affect the performance properties of the precipitated silicas of the present invention. For this reason, the silicas of the present invention are preferably distinguished by a $d_{90}$ value, relative to the volume-based particle distribution curve, of between 0.01 and 10 μm, preferably between 1 and 10 μm, more preferably between 2 and 8 μm and with particular preference between 3 and 7 μm. The d90 value, relative to the volume-based particle distribution curve, includes all values and subvalues therebetween, especially including 0.05, 0.1, 0.5, 1, 1.5, 2, 2.5, 3, 3.5, 4, 4.5, 5, 5.5, 6, 6.5, 7, 7.5, 8, 8.5, 9 and 9.5 μm.

The particle distributions may be monomodal or bimodal, preferably bimodal.

It has also been observed that for all of the above-described embodiments of the silicas of the present invention it may be of particular advantage if from the outset the silica introduces very little moisture into the silicone sealant. The silicas of the present invention may therefore have an initial moisture content, expressed by loss on drying, of 0.1% to 3.0%, preferably of 0.2% to 2.5%, more preferably 0.3% to 2.0%, and with particular preference 0.4% to 1.8% by weight and/or a loss on ignition of 0.1%-3.0%, preferably 0.2% to 3.0%, more preferably 0.3% to 2.0%, and with particular preference 0.4% to 1.8% by weight. The loss on drying includes all values and subvalues therebetween, especially including 0.5, 1, 1.5, 2 and 2.5% by weight. The loss on ignition includes all values and subvalues therebetween, especially including 0.5, 1, 1.5, 2 and 2.5% by weight.

Finally, it has been observed for all of the above-described embodiments of the silicas of the present invention that it may be of particular advantage if the silica has a pH value in the range from 4 to 8, preferably 4.5 to 7.5. The pH includes all values and subvalues therebetween, especially including 4.5, 5, 5.5, 6, 6.5, 7 and 7.5. If the pH is too high then the situation may arise that, following prolonged storage (e.g. after several days), the silicone compound no longer properly crosslinks, but instead remains tacky.

The stated ranges of preference may be set independently of one another.

The silicas of the present invention can be prepared by a process which comprises the steps described below of A. reacting at least one silicate with at least one acidifier,
B. filtering and washing the resulting silica,
C. drying the resulting silica or filter cake, and
D. heat-treating the dried silica.

Step A here preferably comprises the substeps of

Aa preparing an initial charge of water or of water and at least one silicate and/or a silicate solution, the pH of the resulting initial charge being preferably between 5 and 10 and the temperature of the initial charge being preferably between 80 and 100° C.

Ab metering at least one silicate and/or a silicate solution and at least one acidifier into the initial charge from substep Aa) with stirring at 80 to 100° C. until the solids content of the precipitation suspension reaches a level which leads to the solids content which is to be reached in substep Ac). With particular preference, silicate and/or silicate solution and acidifier are added simultaneously and/or in such a way that the pH for the period of substep Ab) is kept constant at a level between 7 and 10.

Ac adding an acidifier at a temperature of the precipitation suspension of 80 to 100° C., so that the pH of the precipitation suspension is lowered to 2 to 6 and the solids content of the precipitation suspension at the end of this substep is between 30 and 70 g/l.

Preferably the silicas of the present invention are ground. This takes place with particular preference by grinding the silicas of the present invention in a step Ca, i.e. between steps C and D, or in a step E, i.e. after step D, or both in step Ca, i.e. between steps C and D, and in step E, i.e. after step D.

All known forms of silicate are suitable for the silicates or silicate solutions used in step A) of the process of the present invention. The silicates used in accordance with the present invention are preferably alkaline silicates, e.g. sodium or potassium silicates. With particular preference the silicate in step A is sodium silicate (water glass). Its weight ratio of $SiO_2$ to $Na_2O$ is between 2 and 4, preferably between 3 and 3.6 and more preferably between 3.3 and 3.5. The $SiO_2$ content is preferably between 20% and 40% by weight, preferably between 25% and 30% by weight. The weight ratio of $SiO_2$ to $Na_2O$ includes all values and subvalues therebetween, especially including 2.2, 2.4, 2.6, 2.8, 3, 3.2, 3.4, 3.6, and 3.8. The $SiO_2$ content includes all values and subvalues therebetween, especially including 22, 24, 26, 28, 30, 32, 34, 36 and 38% by weight.

Acidifiers are acidic compounds of organic or inorganic type which can be used to lower the pH of the precipitation suspension. With preference it is possible to use inorganic acids such as hydrochloric acid, phosphoric acid, sulphuric acid or nitric acid, or organic acids such as acetic acid, formic acid or carbonic acid or carbon dioxide. Both dilute and concentrated acids can be used. With particular preference the process of the present invention uses sulphuric acid.

In the majority of cases the silicate and/or the silicate solution and acidifier used in substeps Aa) to Ac) are identical.

The pH of the initial charge in substep Aa) is preferably between 7 and 10, more preferably between 8 and 9. The temperature of the initial charge is set at 80 to 100° C., preferably at 85 to 95° C., In substep Ab) silicate and acidifier are metered in preferably simultaneously. The addition of the two components preferably takes place continuously constantly over the entire period of substep Ab). During this period the temperature remains at 80 to 100° C., preferably at 85 to 95° C. The period of the addition lasts until the solids content to be achieved at the end of step Ac) has been achieved. It may in this case be necessary to continue the precipitation beyond the viscosity rise point. This viscosity rise point corresponds to the point in time at which a sharp rise is observed in the viscosity of the precipitation suspension in the course of precipitation; cf. EP 0643015. During substep Ab), in which the precipitation of the silica begins, the pH is as far as possible kept constant at a level of between 7 and 10, preferably constant at a level of between 7.5 and 9.5 and with very particular preference at a pH of between 8 and 9. Corrections to an off-target pH are generally made by increasing or lowering the addition of the acidifier, so that the set pH preferably fluctuates only by ±0.2 pH units, more preferably by only ±0.1 pH units.

Through addition of an acidifier at a temperature of the precipitation suspension of 80 to 100° C. its pH is lowered in substep Ac) to 2 to 6, preferably 3 to 6, more preferably to 3 to 4. The solids content of the precipitation suspension at the end of this substep is between 30 and 70 g/l, preferably between 45 and 60 g/l and with very particular preference between 45 and 55 g/l.

Without in any way being tied to one particular theory, the intention is that, by suitable choice of the process parameters, a chain-like structure of the aggregates should be constructed in substep Ab). A reinforcement of this hitherto quite loose aggregate structure is attained by the correspondingly slow further precipitation even after the viscosity rise point.

The metering rates in step Ab) are to be selected in all embodiments of the process of the present invention both before and after the viscosity rise point such that the solids content which is to be achieved after acidification in step Ac), of 30 to 70 g/l, is reached.

The filtration, liquefaction (e.g. in accordance with DE 2447613) and both longer and accelerated drying of the silicas of the present invention are familiar to the person skilled in the art and can be looked up, for example in the documents specified in the description. The filtration and the washing of the silica take place preferably in such a way that the conductivity of the end product is <1000 µS/cm, preferably <500 µS/cm and more preferably <200 µS/cm.

The silica of the present invention is dried preferably in a pneumatic (air) conveying drier, spray drier, rack drier, belt drier, rotary tube drier, flash drier, spin-flash drier or nozzle tower drier. These drying variants include operation with an atomizer, with a single-fluid or two-fluid nozzle or of an integrated fluid bed. Spray drying may be carried out in accordance for example with U.S. Pat. No. 4,094,771.

If the selected mode of drying is spray drying then the filter cake should be redispersed beforehand. Redispersion takes place preferably in water or aqueous acid so that the dispersion has a pH of 4 to 7. It should be ensured here that the silica dispersion when redispersion is at an end has a solids content of 5% to 18%, preferably 8% to 13% by weight, more preferably 9% to 11% by weight, and that in the course of redispersion the shearing forces acting on the silica are not too great. This can be achieved, for example, by stirring with a rotary speed of <1000 rpm, with preferably generalized rather than localized stirring. The redispersed silica dispersion is metered into the spray drier preferably such that the temperature at the drier outlet is from 100 to 170° C., preferably 130-160° C.

A substantial step for setting the silanol group density and arrangement of silanol groups on the silica surface, in addition to the precipitation, in which the chain-like structure is constructed, is the heat treatment to be carried out in step D. This heat treatment may be carried out batchwise or continuously. For the heat treatment it is possible, for example, to use a fluidized-bed, fluid-bed or rotary-tube reactor. It should be ensured that in the course of the heat treatment, the temperature distribution and the process gas atmosphere are homogeneous, so that all of the silica particles are exposed to identical conditions. The process gas must have a sufficient steam concentration. The steam concentration is preferably 10% to 95% by volume, more preferably 40% to 90% by volume, very preferably 50% to 90% by volume. The steam concentration includes all values and subvalues therebetween, especially including 20, 25, 30, 35, 40, 45, 50, 55, 60, 65, 70, 75, 80, 85 and 90% by volume.

Particularly when using a rotary-tube reactor it must be ensured that the temperatures everywhere are the same, i.e. that no "cold zones" exist in which the steam could condense. The condensed steam may lead to the agglomeration of the silicas. The particular conditions during the heat treatment of the present invention also ensure that a silica which has already been ground prior to heat treatment need not be ground once again after heat treatment, in other words that no instances of caking or agglomeration arise, such caking or agglomeration otherwise having to be removed by grinding again after heat treatment.

Preference is given to using a fluidized-bed or fluid-bed reactor. By a fluidized bed is meant the following:

If a flow of gases from below traverses fine-particled bulk product lying on horizontal, perforated plates, under certain flow conditions comes about a condition is similar to that of a boiling liquid; the layer bubbles; the particles of the bulk material are located within the layer in a continually fluidizing up-and-down motion and thus remain, so to speak, in suspension. Terms also used are therefore suspension bed, fluidized bed, fluid bed, and fluidizing. The associated large surface area of the fluidized product also facilitates the drying and heat treatment of solids.

It is preferred that during heat treatment all particles of silica are exposed to the same temperature and the same process gas. The temperature differences between the hottest and coldest point ought to be as small as possible. Consequently the temperature of the filter candles as well must not be below the product temperature.

With very particular preference, the heat treatment in step D of the process of the present invention takes place in accordance with substeps Da) to De) below:

Da. introducing the silica into the fluidized-bed reactor.
Db. preheating the reactor to 300 to 800° C., the reactor being traversed at the same time by a flow of inert gas and/or nitrogen/air mixture in such a way as to produce a fluidization velocity of 0.02 to 0.06 m/s.
Dc. feeding in a gas mixture I comprising steam and an inert gas, e.g. nitrogen, or a gas mixture II comprising steam, an inert gas and air, at 300 to 800° C. for a period of 0.25 to 6 h, the gas mixture traversing the reactor with a fluidization velocity of 0.02 to 0.06 m/s, and the gas mixtures I and II having a steam concentration of 10 to 95% by volume and in the case of gas mixture II an oxygen content of 0.01% to 21% by volume.
Dd. interrupting the addition of steam and expelling the steam by means of an inert gas, nitrogen for example, and/or of an inert gas/air mixture at 300 to 800° C., the gas or gas mixture traversing the reactor with a fluidization velocity of 0.02 to 0.06 m/s, and, if using an inert gas/air mixture, said mixture having an oxygen content of 0.01% to 21% by volume.
De. cooling the heat-treated silica to room temperature in a dry process atmosphere, and, if using an inert gas/air mixture, said mixture having an oxygen content of 0.01% to 21% by volume.

After the silica has been introduced into the fluidized-bed reactor (substep Da)), the reactor is heated in substep Db) to an operating temperature of 300 to 800° C., preferably of 350 to 690° C. and more preferably of 400 to 650° C. During the heating operation the reactor is traversed by a flow of inert gas, preferably nitrogen and/or a mixture of an inert gas and dry air, in such a way that a fluidization velocity of 0.02 to 0.06 m/s is set.

After the operating temperature has been reached, in substep Dc) a gas mixture I comprising steam and an inert gas, preferably nitrogen, or a gas mixture II comprising steam, an inert gas and air is passed through the reactor for a period of 0.25 to 6 h, preferably 0.5 to 5 h, more preferably 1 to 4 h, very preferably 2 to 4 h. The fluidization velocity of the gas mixture is 0.02 to 0.06 m/s. The gas mixtures I and II have a steam concentration of 10% to 95% by volume, preferably 40% to 90% by volume, very preferably 50% to 90% by volume and, in the case of gas mixture II an oxygen content of 0.01% to 21% by volume.

The techniques for optional grinding of the silicas of the present invention are known to the person skilled in the art and can be looked up for example in *Ullmann, 5th edition, B2*, 5-20. For the grinding of the silicas of the present invention in step Ca) and/or in step E) it is preferred to use grinding systems (grinding apparatus) comprising or consisting of impact mills or jet mills, preferably opposed-jet mills. Particular preference is given to using fluid-bed opposed-jet mills. With very particular preference, grinding takes place by means of a grinding system (grinding apparatus), with particular preference a grinding system comprising a jet mill, characterized in that the mill of the grinding system is operated in the grinding phase with an operational medium selected from the group consisting of gas and/or vapor, preferably steam, and/or a gas comprising steam, and in that the grinding chamber is heated in a heating phase, i.e. before the actual operation with the operational medium, such that the temperature in the grinding chamber and/or at the mill outlet is higher than the dew point of the vapor and/or operational medium.

Grinding takes place with particular preference in accordance with the method described in DE 10 2006 048 850.4, using the grinding system (mill) described therein the operational medium used being, with especial preference, steam. German patent applications DE 102006024591.1 filed May 26, 2006, DE 102007004757.8, filed Jan. 31, 2007 and DE 102006048850.4, filed Oct. 16, 2006, are incorporated herein by reference.

The grinding parameters are preferably chosen such that the ground product has a fine-particle fraction in the region smaller than 1 μm in the volume-based particle distribution, of 5% to 100%, preferably 10% to 95%, more preferably 15% to 95%, with very particular preference 20% to 90%, and in particular from 40% to 80%, and/or a $d_{90}$ value in the volume-based particle distribution curve of between 0.01 and 10 μm.

Figure 7:
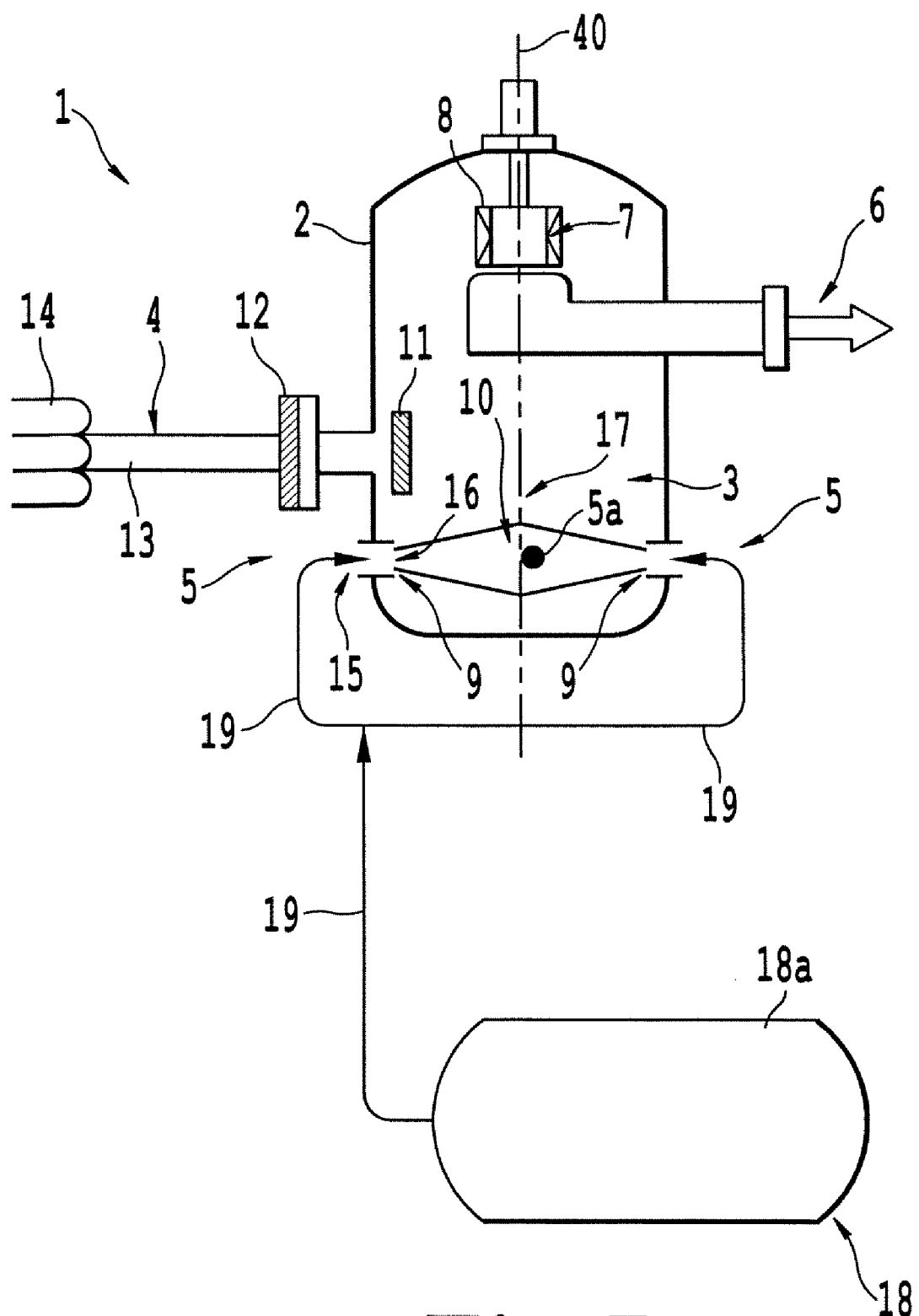
FIG. 7 shows, in the form of a diagram, a working example of a jet mill in a partly cutaway schematic drawing.

In FIG. 7, the reference numerals are as follows: jet mill (1), cylindrical housing (2), grinding chamber (3), feed for material to be grinded (milled) (4), grinding jet inlet (5), heating opening or nozzle (5a), product outlet (6), air classifier (7), classifying wheel (8), inlet opening or inlet nozzle (9), grinding jet (10), heat source (11), heat source (12), supply pipe (13), thermal insulation jacket (14), inlet (15), outlet (16), centre of grinding chamber (17), reservoir or generating means (18), and pipe installations (19).

Figure 8:
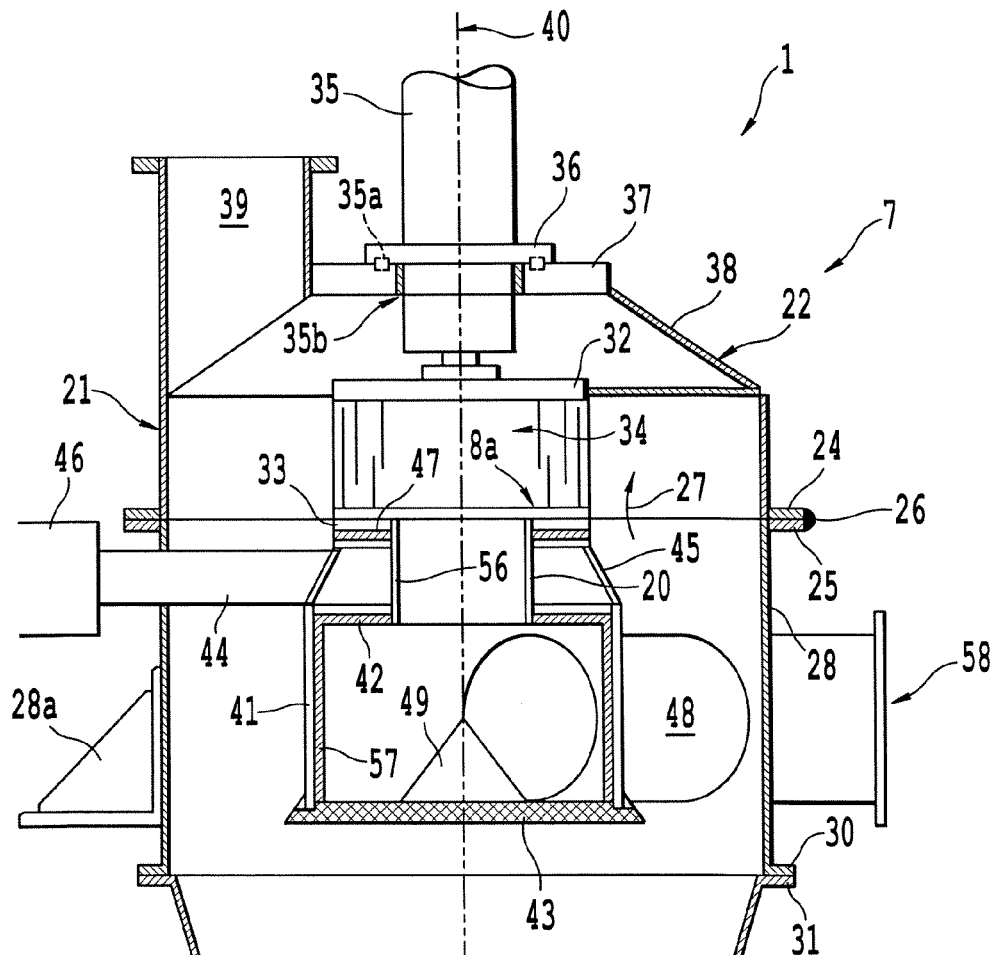
FIG. 8 shows a working example of an air classifier analogous to FIG. 10 but with flushing of classifier gap 8a and shaft lead-through 35b.
Figure 8:
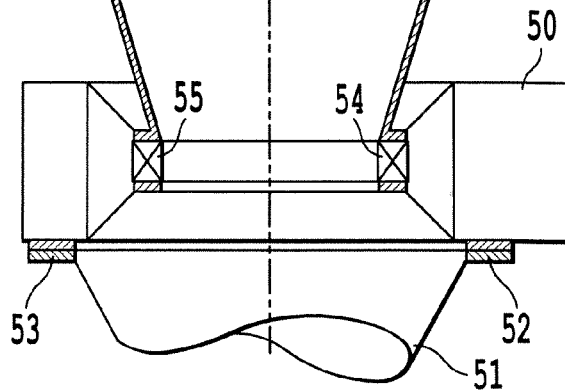

In FIG. 8, the reference numerals are as follows: jet mill (1), air classifier (7), classifier gap (8a), exit port (immersed pipe) (20), classifier housing (21), top housing part (22), Bottom housing part (23), circumferential flange (24), circumferential flange (25), articulated joint (26), arrow (27), classifier chamber housing (28), carrying arms (28a),discharge cone (29), Flange (30), Flange (31), cover plate (32), cover plate (33), paddle (34), classifying wheel shaft (35), pivot bearing (35a), top machined plates (36), Bottom machined plate (37), end section of housing (38), product feed port (39), axis of rotation (40), outlet chamber (41), top cover plate (42), removable lid (43), carrying arms (44), conical annular housing (45), intake filter (46), perforated plate (47), fines discharge pipe (48), deflection cone (49), classifying air entry coil (50), coarse material discharge (51), flange (52), flange (53), dispersion zone (54), flange machined (bevelled) at the inside edge, and lining (55), replaceable protection pipe (56), replaceable protection pipe (57), fines exit/outlet (58).

Figure 9:
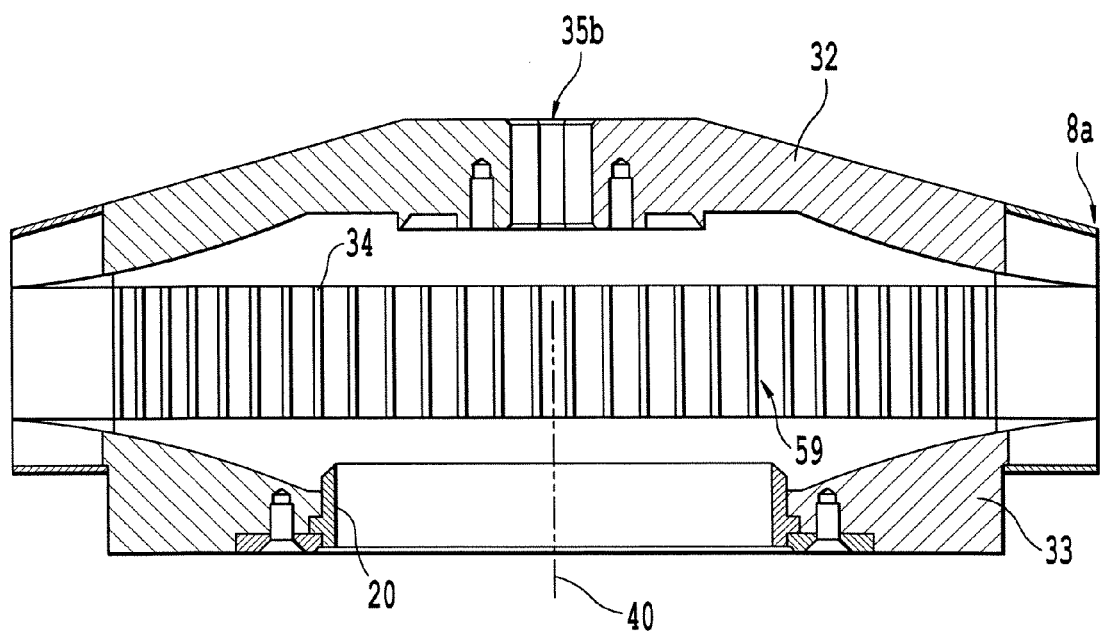
FIG. 9 shows, in schematic representation and as a vertical section, the classifying wheel of an air classifier analogous to FIG. 11 but with flushing of classifier gap 8a and shaft lead-through 35b.

In FIG. 9, the reference numerals are as follows: classifier gap (8a), exit port (immersed pipe) (20), cover plate (32), cover plate (33), paddle (34), shaft lead-through (35b), axis of rotation (40), ring of paddles (59).

Figure 10:
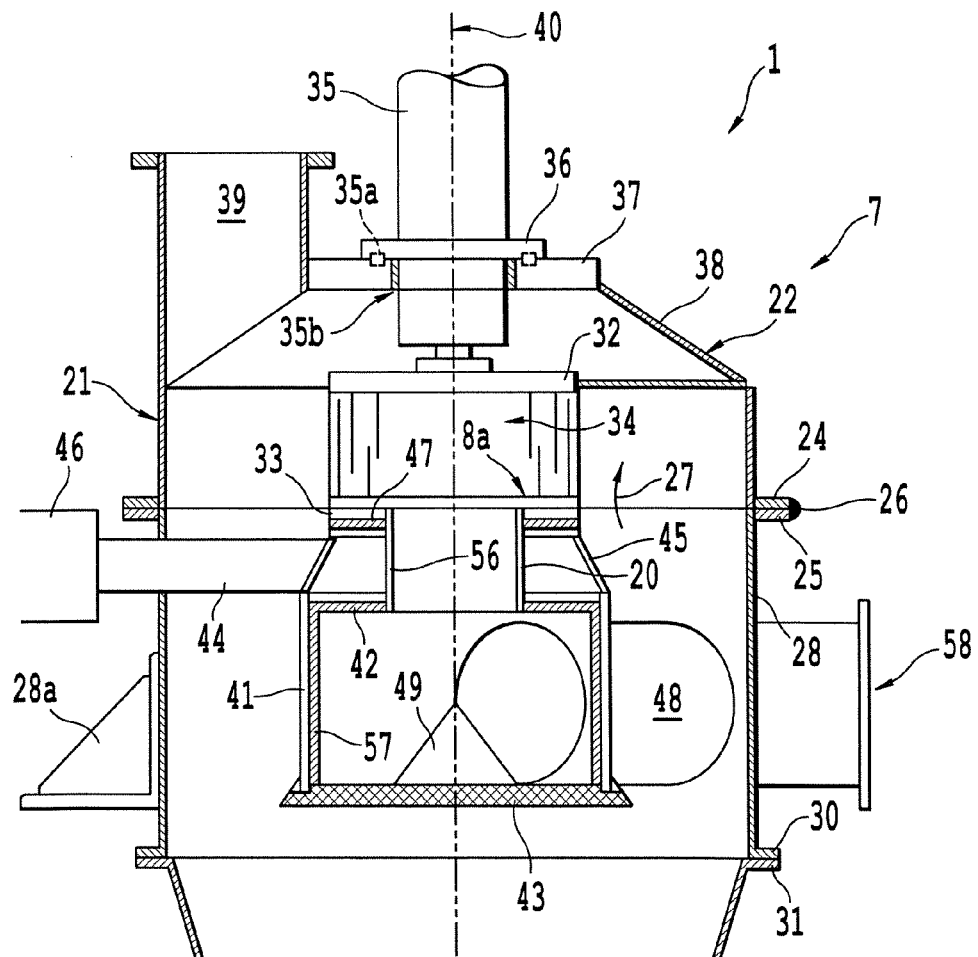
FIG. 10 shows a working example of an air classifier of a jet mill in vertical arrangement and as a schematic middle longitudinal section, the outlet tube for the mixture of classifying air and solid particles being coordinated with the classifying wheel.
Figure 10:
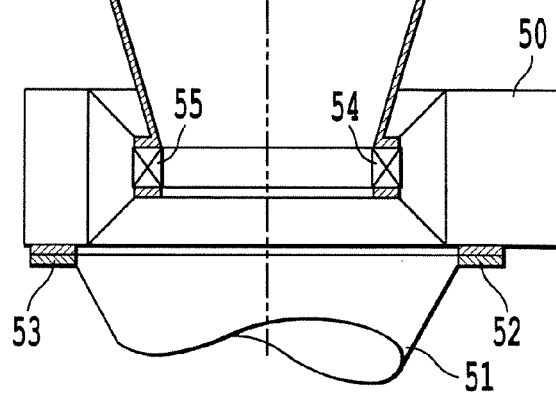

In FIG. 10, the reference numerals are as follows: jet mill (1), air classifier (7), exit port (immersed pipe) (20), classifier housing (21), top housing part (22), Bottom housing part (23), circumferential flange (24), circumferential flange (25), articulated joint (26), arrow (27), classifier chamber housing (28), carrying arms (28a),discharge cone (29), Flange (30), Flange (31), cover plate (32), cover plate (33), paddle (34), classifying wheel shaft (35), pivot bearing (35a), top machined plates (36), Bottom machined plate (37), end section of housing (38), product feed port (39), axis of rotation (40), outlet chamber (41), top cover plate (42), removable lid (43), carrying arms (44), conical annular housing (45), intake filter (46), perforated plate (47), fines discharge pipe (48), deflection cone (49), classifying air entry coil (50), coarse material discharge (51), flange (52), flange (53), dispersion zone (54), flange machined (bevelled) at the inside edge, and lining (55), replaceable protection pipe (56), replaceable protection pipe (57), fines exit/outlet (58).

Figure 11:
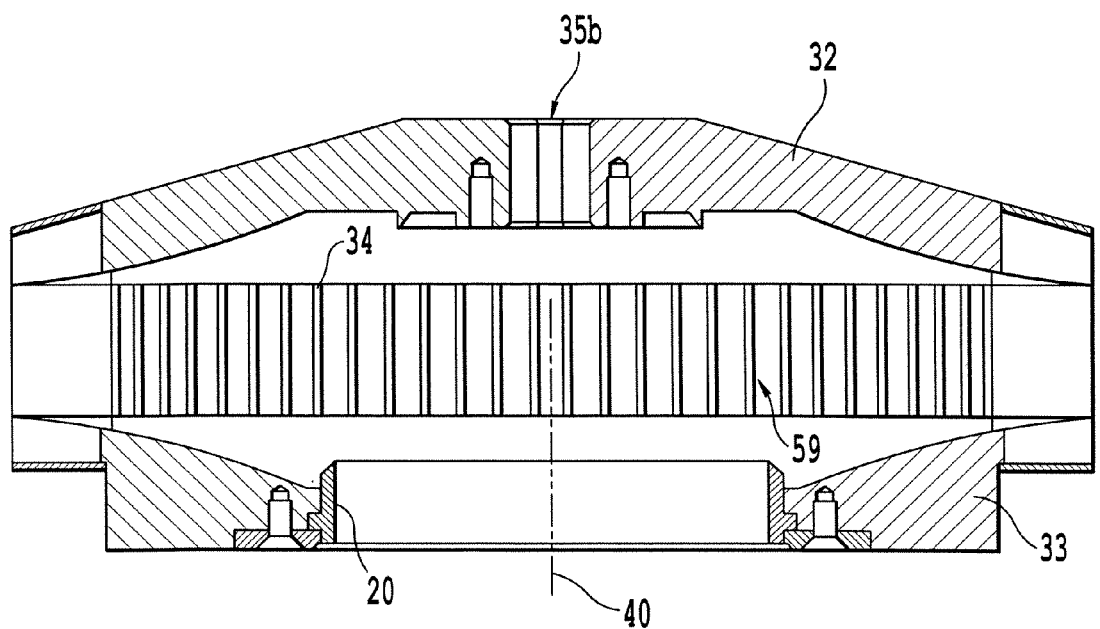
FIG. 11 shows, in schematic representation and as a vertical section, a classifying wheel of an air classifier.

In FIG. 11, the reference numerals are as follows: exit port (immersed pipe) (20), cover plate (32), cover plate (33), paddle (34), axis of rotation (40), ring of paddles (59).

In one especially preferred embodiment, in preparation for actual grinding with superheated steam, a fluid-bed opposed-jet mill as shown in FIG. 7, with an integrated dynamic air classifier as shown in FIGS. 8 and 9, is first heated via the two heating openings or nozzles (5*a*) (of which only one is depicted in FIG. 7) which are charged with hot compressed air, preferably at 10 bar and 160° C., until the mill exit temperature is higher than the dew point of the steam and/or operational medium, preferably about 105° C.

Connected downstream of the mill, for the separation of the ground material, is a filter system (not shown in FIG. 7) whose filter housing is heated in its lower third indirectly, via attached heating coils, by means of saturated steam (preferably 6 bar saturated steam), likewise for the purpose of preventing condensation. All of the apparatus surfaces in the region of the mill, the separation filter, and the supply lines for steam and hot compressed air have special insulation.

After the desired heating temperature has been reached, the supply of hot compressed air to the heating nozzles is shut off and the charging of the three grinding nozzles with superheated steam, preferably at 38 bar (abs) and 325° C., is commenced.

In order to protect the filter medium used in the separation filter and also in order to set a defined level of residual water in the ground material, of preferably 2% to 6% by weight, water is introduced in the starting phase, and during grinding, into the grinding chamber of the mill, via a two-fluid nozzle operated with compressed air, as a function of the mill exit temperature.

The feed quantity is regulated as a function of the classifier flow which comes about. The classifier flow regulates the feed quantity such that it is not possible to exceed approximately 70% by weight of the nominal flow.

The feed for material to be grinded (milled) (4) which functions here is a speed-regulated bucket wheel which meters the feed material from a reservoir container via a cyclical lock, which serves as a barometric endpoint, into the grinding chamber, which is at superatmospheric pressure.

The coarse material is comminuted in the expanding steam jets (grinding gas). Together with the depressurized grinding gas, the product particles ascend in the centre of the mill vessel to the classifying wheel. Depending on the classifier speed and grinding steam quantity which have been set, the particles whose fineness is sufficient enter along with the grinding steam into the fines exit, and from there they pass into the downstream separating system, while particles which are too coarse pass back into the grinding zone and are subjected to a repeat comminuting. The discharge of the separated fines from the separation filter into the subsequent silo storage and bagging operation takes place by means of a bucket-wheel lock.

The grinding pressure of the grinding gas that obtains at the grinding nozzles, and the resulting volume of grinding gas, in conjunction with the speed of the dynamic paddle wheel classifier, determine the fineness of the particle-size distribution function and also the upper particle-size limit.

In a preferred embodiment, grinding is carried out as follows.

The process according to the invention is carried out in a milling system (milling apparatus), preferably in a milling system comprising a jet mill, particularly preferably comprising an opposed jet mill. For this purpose, a feed material to be comminuted is accelerated in expanding gas jets of high velocity and comminuted by particle-particle impacts. Very particularly preferably used jet mills are fluidized-bed opposed jet mills or dense-bed jet mills or spiral jet mills. In the case of the very particularly preferred fluidized-bed opposed jet mill, two or more milling jet inlets are present in the lower third of the milling chamber, preferably in the form of milling nozzles, which are preferably present in a horizontal plane. The milling jet inlets are particularly preferably arranged at the circumference of the preferably round milling container so that the milling jets all meet at one point in the interior of the milling container. Particularly preferably, the milling jet inlets are distributed uniformly over the circumference of the milling container. In the case of three milling jet inlets, the space would therefore be 120° in each case.

In a special embodiment of the process according to the invention, the milling system (milling apparatus) comprises a classifier, preferably a dynamic classifier, particularly preferably a dynamic paddle wheel classifier, especially preferably a classifier according to FIGS. 10 and 11.

In a particularly preferred embodiment, a dynamic air classifier according to FIGS. 8 and 9 is used. This dynamic air classifier contains a classifying wheel and a classifying wheel shaft and a classifier housing, a classifier gap being formed between the classifying wheel and the classifier housing and a shaft lead-through being formed between the classifying wheel shaft and the classifier housing, and is characterized in that flushing of classifier gap and/or shaft lead-through with compressed gases of low energy is effected.

When using a classifier in combination with the jet mill operated under the conditions according to the invention, a limit is imposed on the oversize particles, the product particles ascending together with the expanded gas jets being passed from the centre of the milling container through the classifier, and the product which has a sufficient fineness then being discharged from the classifier and from the mill. Particles which are too coarse return to the milling zone and are subjected to further comminution.

In the milling system, a classifier can be connected as a separate unit downstream of the mill, but an integrated classifier is preferably used.

This particular preferred grinding process according to the present invention comprises a heat-up phase which is included upstream of the actual milling step, in which heat-up phase it is ensured that the milling chamber, particularly preferably all substantial components of the mill and/or of the milling system on which water and/or steam could condense, is/are heated up so that its/their temperature is above the dew point of the vapour. The heating up can in principle be effected by any heating method. However, the heating up is preferably effected by passing hot gas through the mill and/or the entire milling system so that the temperature of the gas is higher at the mill exit than the dew point of the vapour. Particularly preferably, it is ensured that the hot gas preferably sufficiently heats up all substantial components of the mill and/or of the entire milling system which come into contact with the steam.

The heating gas used can in principle be any desired gas and/or gas mixtures, but hot air and/or combustion gases and/or inert gases are preferably used. The temperature of the hot gas is above the dew point of the steam.

The hot gas can in principle be introduced at any desired point into the milling chamber. Inlets or nozzles are preferably present for this purpose in the milling chamber. These inlets or nozzles may be the same inlets or nozzles through which the milling jets are also passed during the milling phase (milling nozzles). However, it is also possible for separate inlets or nozzles (heating nozzles) through which the hot gas and/or gas mixture can be passed to be present in the milling chamber. In a preferred embodiment, the heating gas or heating gas mixture is introduced through at least two, preferably three or more, inlets and nozzles which are arranged in a plane and are arranged at the circumference of the preferably round mill container in such a way that the jets all meet at one point in the interior of the milling container. Particularly preferably, the inlets or nozzles are distributed uniformly over the circumference of the milling container.

During the milling, a gas and/or a vapour, preferably steam and/or a gas/steam mixture, is let down through the milling jet inlets, preferably in the form of milling nozzles, as operating medium. This operating medium has as a rule a substantially higher sound velocity than air (343 m/s), preferably at least 450 m/s. Advantageously, the operating medium comprises steam and/or hydrogen gas and/or argon and/or helium. It is particularly preferably superheated steam. In order to achieve very fine milling, it has proved particularly advantageous if the operating medium is let down into the mill at a pressure of 15 to 250 bar, particularly preferably of 20 to 150 bar, very particularly preferably 30 to 70 bar and especially preferably 40 to 65 bar. The operating medium also particularly preferably has a temperature of 200 to 800° C., particularly preferably 250 to 600° C. and in particular 300 to 400° C. The pressure includes all values and subvalues therebetween, especially including 20, 40, 60, 80, 100, 120, 140, 160, 180, 200, 220 and 240 bar. The temperature of the operating medium includes all values and subvalues therebetween, especially including 250, 300, 350, 400, 450, 500, 550, 600, 650, 700, 750° C.

In the case of steam as an operating medium, i.e. particularly when the vapour feed pipe is connected to a steam source, it proves to be particularly advantageous if the milling or inlet nozzles are connected to a vapour feed pipe which is equipped with expansion bends.

Furthermore, it has proved to be advantageous if the surface of the jet mill has as small a value as possible and/or the flow paths are at least substantially free of projections and/or if the components of the jet mill are designed for avoiding accumulations. By these measures, deposition of the material to be milled in the mill can additionally be prevented.

The invention is explained in more detail merely by way of example with reference to the below-described preferred and special embodiments of the process according to the invention and the preferred and particularly suitable versions of jet mills and the drawings and descriptions of the drawings, i.e. it is not limited to these working examples and use examples or to the respective combinations of features within individual working examples.

Individual features which are stated and/or shown in relation to specific working examples are not limited to these working examples or the combination with the other features of these working examples but can be combined, within the technical possibilities, with any other variants, even if they are not separately discussed in the present documents.

Identical reference numerals in the individual figures and images of the drawings designate identical or similar components or components having an identical or similar effect. The diagrams in the drawing also clarify those features which are not provided with reference numerals, regardless of whether such features are described below or not. On the other hand, features which are contained in the present description but not visible or shown in the drawing, are also readily understandable for a person skilled in the art.

As already indicated above, a jet mill, preferably an opposed jet mill, comprising integrated classifier, preferably an integrated dynamic air classifier, can be used for the production of very fine particles in the process according to the invention. Particularly preferably, the air classifier contains a classifying wheel and a classifying wheel shaft and a classifier housing, a classifier gap being formed between the classifying wheel and the classifier housing and a shaft lead-through being formed between the classifying wheel shaft and the classifier housing, and is operated in such a way that flushing of classifier gap and/or shaft lead-through with compressed gases of low energy is effected.

Preferably, the flushing gas is used at a pressure of not more than at least approximately 0.4 bar, particularly preferably not more than at least about 0.3 bar and in particular not more than about 0.2 bar above the internal pressure of the mill. The internal pressure of the mill may be at least about in the range from 0.1 to 0.5 bar.

Furthermore, it is preferable if the flushing gas is used at a temperature of about 80 to about 120° C., in particular approximately 100° C., and/or if the flushing gas used is low-energy compressed air, in particular at about 0.3 bar to about 0.4 bar.

The speed of a classifying rotor of the air classifier and the internal amplification ratio V(=Di/DF) can be chosen or set or can be regulatable so that the circumferential speed of the operating medium (B) at a dip tube or outlet nozzle coordinated with the classifying wheel reaches up to 0.8 times the sound velocity of the operating medium.

In the formula V(=Di/DF), Di represents the inner diameter of the classifying wheel (8), i.e. the distance between the inner edges of the paddles (34), and DF represents the inner diameter of the immersed pipe (20). An example for a particularly preferred combination comprises an inner diameter of the classifying wheel (8) Di=280 mm and an inner diameter of the immersed pipe (20) DF=100 mm.

This can be further developed if the speed of a classifying rotor of the air classifier and the internal amplification ratio V(=Di/DF) are chosen or set or are regulatable so that the circumferential speed of the operating medium (B) at the dip tube or outlet nozzle reaches up to 0.7 times and particularly preferably up to 0.6 times the sound velocity of the operating medium.

In particular, it is furthermore possible advantageously to ensure that the classifying rotor has a height clearance which increases with decreasing radius, that area of the classifying rotor through which flow takes place preferably being at least approximately constant. Alternatively or in addition, it may be advantageous if the classifying rotor has an interchangeable, corotating dip tube. In an even further variant, it is preferable to provide a fines outlet chamber which has a widening cross section in the direction of flow.

Furthermore, the jet mill according to the invention can advantageously contain in particular an air classifier which contains the individual features or combinations of features of the wind classifier according to EP 0 472 930 B1. The entire disclosure content of EP 0 472 930 B1 is hereby fully incorporated by reference in order to avoid simply adopting identical subject matter. In particular, the air classifier may contain means for reducing the circumferential components of flow according to EP 0 472 930 B1. It is possible in particular to ensure that an outlet nozzle which is coordinated with the classifying wheel of the air classifier and is in the form of a dip tube has, in the direction of flow, a widening cross section which is preferably designed to be rounded for avoiding eddy formations.

Preferred and/or advantageous embodiments of the milling system which can be used in the process according to the invention or of the mill are evident from FIGS. 7 to 11 and the associated description, it once again being emphasized that these embodiments merely explain the invention in more detail by way of example, i.e. said invention is not limited to these working examples and use examples or to the respective combinations of features within individual working examples.

Individual features which are stated and/or shown in relation to specific working examples are not limited to these working examples or the combination with the other features of these working examples but can be combined within the technical possibilities with any other variants, even if they are not separately discussed in the present documents.

Identical reference numerals in the individual figures and images of the drawings designate identical or similar components and components having an identical or similar effect. The diagrams in the drawing also clarify those features which are not provided with reference numerals, regardless of whether such features are described below or not. On the other hand, features which are contained in the present description but aren't visible or shown in the drawing are also readily understandable for a person skilled in the art.

FIG. 7 shows a working example of a jet mill 1 comprising a cylindrical housing 2, which encloses a milling chamber 3, a feed 4 for material to be grinded (milled), approximately at half the height of the milling chamber 3, at least one milling jet inlet 5 in the lower region of the milling chamber 3 and a product outlet 6 in the upper region of the milling chamber 3. Arranged there is an air classifier 7 having a rotatable classifying wheel 8 with which the milled material (not shown) is classified in order to remove only milled material below a certain particle size through the product outlet 6 from the milling chamber 3 and to feed milled material having a particle size above the chosen value to a further milling process.

The classifying wheel 8 may be a classifying wheel which is customary in air classifiers and the blades of which (cf. below, for example in relation to FIG. 11) bound radial blade channels, at the outer ends of which the classifying air enters and particles of relatively small particle size or mass are entrained to the central outlet and to the product outlet 6 while larger particles or particles of greater mass are rejected under the influence of centrifugal force. Particularly preferably, the air classifier 7 and/or at least the classifying wheel 8 thereof are equipped with at least one design feature according to EP 0 472 930 B1.

It is possible to provide only one milling jet inlet 5, for example consisting of a single, radially directed inlet opening or inlet nozzle 9, in order to enable a single milling jet 10 to meet, at high energy, the particles of material to be milled which reach the region of the milling jet 10 from the feed 4 for material to be grinded (milled), and to divide the particles of material to be milled into smaller particles which are taken in by the classifying wheel 8 and, if they have reached an appropriately small size or mass, are transported to the outside through the product outlet 6. However, a better effect is achieved with milling jet inlets 5 which are diametrically opposite one another in pairs and form two milling jets 10 which strike one another and result in more intense particle division than is possible with only one milling jet 10, in particular if a plurality of milling jet pairs are produced.

Preferably two or more milling jet inlets, preferably milling nozzles, in particular 3, 4, 5, 6, 7, 8, 9, 10, 11 or 12 milling jet inlets, which are arranged in the lower third of the preferably cylindrical housing of the milling chamber, are used. These milling jet inlets are ideally arranged distributed in a plane and uniformly over the circumference of the milling container so that the milling jets all meet at one point in the interior of the milling container. Particularly preferably, the inlets or nozzles are distributed uniformly over the circumference of the milling container. In the case of three milling jets, this would be an angle of 120° between the respective inlets or nozzles. In general, it may be said that the larger the milling chamber, the more inlets or milling nozzles are used.

In a preferred embodiment of the process according to the invention, the milling chamber can, in addition to the milling jet inlets, contain heating openings or nozzles 5a, preferably in the form of heating nozzles, through which hot gas can be passed into the mill in the heat-up phase. These nozzles or openings can—as already described above—be arranged in the same plane as the milling openings or nozzles 5. One heating opening or nozzle 5a, but preferably also a plurality of heating openings or nozzles 5a, particularly preferably 2, 3, 4, 5, 6, 7 or 8 heating openings or nozzles 5a, may be present.

In a very particularly preferred embodiment, the mill contains two heating nozzles or openings and three milling nozzles or openings.

For example, the processing temperature can furthermore be influenced by using an internal heating source 11 between feed 4 for material to be (grinded) milled and the region of the milling jets 10 or a corresponding heating source 12 in the region outside the feed 4 for material to be grinded (milled), or by processing particles of material to be milled which is in any case already warm and avoids heat losses in reaching the feed 4 for material to be grinded (milled), for which purpose a feed tube 13 is surrounded by a temperature-insulating jacket 14. The heating source 11 or 12, if it is used, can in principle be of any desired form and therefore usable for the particular purpose and chosen according to availability on the market so that further explanations in this context are not required.

In particular, the temperature of the milling jet or of the milling jets 10 is relevant to the temperature, and the temperature of the material to be milled should at least approximately correspond to this milling jet temperature.

For the formation of the milling jets 10 introduced through milling jet inlets 5 into the milling chamber 3, superheated steam is used in the present working example. It is to be assumed that the heat content of the steam after the inlet nozzle 9 of the respective milling jet inlet 5 is not substantially lower than before this inlet nozzle 9. Because the energy necessary for impact comminution is to be available primarily as flow energy, the pressure drop between the inlet 15 of the inlet nozzle 9 and the outlet 16 thereof will be considerable in comparison (the pressure energy will be very substantially converted into flow energy) and the temperature drop too will not be inconsiderable. This temperature drop in particular should be compensated by the heating of the material to be milled, to such an extent that material to be milled and milling jet 10 have the same temperature in the region of the centre 17 of the milling chamber 3 when at least two milling jets 10 meet one another or in the case of a multiplicity of two milling jets 10.

Regarding the design of and procedure for preparing the milling jet 10 comprising superheated steam, in particular in the form of a closed system, reference is made to DE 198 24 062 A1, the complete disclosure content of which in this regard is hereby incorporated by reference in order to avoid simply adopting identical subject matter. For example, milling of hot slag as material to be milled is possible with optimum efficiency by a closed system.

In FIG. 7 of the jet mill 1, any feed of an operating medium B is typified by a reservoir or generation device 18, which represents, for example, a tank 18a, from which the operating medium B is passed via pipe devices 19 to the milling jet inlet 5 or the milling jet inlets 5 to form the milling jet 10 or the milling jets 10.

In particular, starting from a jet mill 1 equipped with an air classifier 7, the relevant working examples being intended and understood herein only as exemplary and not as limiting, a process for producing very fine particles is carried out with this jet mill 1 using an integrated dynamic air classifier 7. Apart from the fact that the milling phase is preceded by a heat-up phase in which all parts which come into contact with the vapour are heated to a temperature above the dew point of the vapour and the fact that a preferably integrated classifier is used, the innovation compared with conventional jet mills is that the speed of the classifying rotor or classifying wheel 8 of the air classifier 7 and the internal amplification ratio V(=Di/DF) are preferably chosen, set or regulated so that the circumferential speed of an operating medium B at a dip tube or outlet nozzle 20 coordinated with the classifying wheel 8 reaches up to 0.8 times, preferably up to 0.7 times and particularly preferably up to 0.6 times the sound velocity of the operating medium B.

With reference to the previously explained variant with superheated steam as operating medium B or as an alternative thereto, it is particularly advantageous to use, as operating medium, gases or vapours B which have a higher and in particular substantially higher sound velocity than air (343 m/s). Specifically, gases or vapours B which have a sound velocity of at least 450 m/s are used as operating medium. This substantially improves the production and the yield of very fine particles compared with processes using other operating media, as are conventionally used according to practical knowledge, and hence optimizes the process overall.

A fluid, preferably the abovementioned steam, but also hydrogen gas or helium gas, is used as operating medium B.

In a preferred embodiment, the jet mill 1, which is in particular a fluidized-bed jet mill or a dense-bed jet mill or a spiral jet mill, is formed or designed with the integrated dynamic air classifier 7 for producing very fine particles or provided with suitable devices so that the speed of the classifying rotor or classifying wheel 8 of the air classifier 7 and the internal amplification ratio V(=Di/DF) are chosen or set or regulatable or controllable so that the circumferential speed of the operating medium B at the dip tube or outlet nozzle 20 reaches up to 0.8 times, preferably up to 0.7 times and particularly preferably up to 0.6 times the sound velocity of the operating medium B.

Furthermore, the jet mill 1 is preferably equipped with a source, for example the reservoir or generation device 18 for steam or superheated steam or another suitable reservoir or generation device, for an operating medium B, or such an operating medium source is coordinated with it, from which, for operation, an operating medium B is fed at a higher and in particular substantially higher sound velocity than air (343 m/s), such as, preferably, a sound velocity of at least 450 m/s. This operating medium source, such as, for example, the reservoir or generation device 18 for steam or superheated steam, contains gases or vapours B for use during operation of the jet mill 1, in particular the abovementioned steam but hydrogen gas and helium gas are also preferred alternatives.

Particularly with the use of hot steam as operating medium B, it is advantageous to provide pipe devices 19 which are equipped with expansion bends (not shown), and are then also to be designated as vapour feed pipe, to the inlet or milling nozzles 9, i.e. preferably when the vapour feed pipe is connected to a steam source as a reservoir or generation device 18.

A further advantageous aspect in the use of steam as operating medium B consists in providing the jet mill 1 with a surface which is as small as possible, or in other words in optimizing the jet mill 1 with regard to as small a surface as possible. Particularly in relation to steam as operating medium B, it is particularly advantageous to avoid heat exchange or heat loss and hence energy loss in the system. This purpose is also served by the further alternative or additional design measures, namely designing the components of the jet mill 1 for avoiding accumulations or optimizing said components in this respect. This can be realized, for example, by using flanges which are as thin as possible in the pipe devices 19 and for connection of the pipe devices 19.

Energy loss and also other flow-relevant adverse effects can furthermore be suppressed or avoided if the components of the jet mill 1 are designed or optimized for avoiding condensation. Even special devices (not shown) for avoiding condensation may be present for this purpose. Furthermore, it is advantageous if the flow paths are at least substantially free of projections or optimized in this respect. In other words, the principle of avoiding as much as possible or everything which can become cold and where condensation may therefore arise is implemented by these design variants individually or in any desired combinations.

Furthermore, it is advantageous and therefore preferable if the classifying rotor has a height clearance increasing with decreasing radius, i.e. towards its axis, in particular that area of the classifying rotor through which flow takes place being at least approximately constant. Firstly or alternatively, it is possible to provide a fines outlet chamber which has a widening cross section in the direction of flow.

A particularly preferred embodiment in the case of the jet mill 1 consists in the classifying rotor 8 having an interchangeable, corotating dip tube 20.

Further details and variants of preferred designs of the jet mill 1 and its components are explained below with reference to FIGS. 10 and 11.

The jet mill 1 preferably contains, as shown in the schematic diagram in FIG. 10, an integrated air classifier 7 which is, for example in the case of designs of the jet mill 1 as a fluidized-bed jet mill or as a dense-bed jet mill or as a spiral jet mill, a dynamic air classifier 7 which is advantageously arranged in the centre of the milling chamber 3 of the jet mill 1. Depending on the volume flow rate of milling gas and classifier speed, the desired fineness of the material to be milled can be influenced.

In the air classifier 7 of the jet mill 1 according to FIG. 10, the entire vertical air classifier 7 is enclosed by a classifier housing 21 which substantially comprises the upper part 22 of the housing and the lower part 23 of the housing. The upper part 22 of the housing and the lower part 23 of the housing are provided at the upper and lower edge, respectively, with in each case an outward-directed circumferential flange 24 and 25, respectively. The two circumferential flanges 24, 25 are present one on top of the other in the installation or operational state of the air classifier 8 and are fixed by suitable means to one another. Suitable means for fixing are, for example, screw connections (not shown). Clamps (not shown) or the like can also serve as detachable fixing means.

At virtually any desired point of the flange circumference, two circumferential flanges 24 and 25 are connected to one another by a joint 26 so that, after the flange connecting means have been released, the upper part 22 of the housing can be swivelled upwards relative to the lower part 23 of the housing in the direction of the arrow 27 and the upper part 22 of the housing is accessible from below and the lower part 23 of the housing from above. The lower part 23 of the housing in turn is formed in two parts and substantially comprises the cylindrical classifier chamber housing 28 with the circumferential flange 25 at its upper open end and a discharge cone 29 which tapers conically downwards. The discharge cone 29 and the classifier chamber housing 28 rest one on top of the other with flanges 30, 31 at the upper and lower end, respectively, and the two flanges 30, 31 of discharge cone 29 and classifier chamber housing 28 are connected to one another by detachable fixing means (not shown) like the circumferential flanges 24, 25. The classifier housing 21 assembled in this manner is suspended in or from support arms 28a, a plurality of which are distributed as far as possible uniformly spaced around the circumference of the classifier or compressor housing 21 of the air classifier 7 of the jet mill 1 and grip the cylindrical classifier chamber housing 28.

A substantial part of the housing internals of the air classifier 7 is in turn the classifying wheel 8 having an upper cover disc 32, having a lower cover disc 33 axially a distance away and on the outflow side and having blades 34 of expedient contour which are arranged between the outer edges of the two cover discs 32 and 33, firmly connected to these and distributed uniformly around the circumference of the classifying wheel 8. In the case of this air classifier 7, the classifying wheel 8 is driven via the upper cover disc 32 while the lower cover disc 33 is the cover disc on the outflow side. The mounting of the classifying wheel 8 comprises a classifying wheel shaft 35 which is positively driven in an expedient manner, is led out of the classifier housing 21 at the upper end and, with its lower end inside the classifier housing 21, supports the classifying wheel 8 non-rotatably in an overhung bearing. The classifying wheel shaft 35 is led out of the classifier housing 21 in a pair of worked plates 36, 37 which close the classifier housing 21 at the upper end of a housing end section 38 in the form of a truncated cone at the top, guide the classifying wheel shaft 35 and seal this shaft passage without hindering the rotational movements of the classifying wheel shaft 35. Expediently, the upper plate 36 can be coordinated in the form of a flange non-rotatably with the classifying wheel shaft 35 and supported nonrotatably via rotary bearing 35a on the lower plate 37, which in turn is coordinated with a housing end section 38. The underside of the cover disc 33 on the outflow side is in the common plane between the circumferential flanges 24 and 25 so that the classifying wheel 8 is arranged in its totality within the hinged upper part 22 of the housing. In the region of the conical housing end section 38, the upper part 22 of the housing also has a tubular product feed nozzle 39 of the feed 4 for material to be grinded (milled), the longitudinal axis of which product feed nozzle is parallel to the axis 40 of rotation of the classifying wheel 8 and its drive or classifying wheel shaft 35 and which product feed nozzle is arranged radially outside on the upper part 22 of the housing, as far as possible from this axis 40 of rotation of the classifying wheel 8 and its drive or classifying wheel shaft 35.

In a particularly preferred embodiment according to FIGS. 8 and 9, the integrated dynamic air classifier 1 contains a classifying wheel 8 and a classifying wheel shaft 35 and a classifier housing, as was already explained. A classifier gap 8a is defined between the classifying wheel 8 and the classifier housing 21, and a shaft lead-through 35b is formed between the classifying wheel shaft and the classifier housing 21 (cf. in this context FIGS. 8 and 9). In particular, starting from a jet mill 1 equipped with such an air classifier 7, the relevant working examples being understood here as being only exemplary and not limiting, a process for producing very fine particles is carried out using this jet mill 1, comprising an integrated dynamic air classifier 7. In addition to the fact that the milling chamber is heated before the milling phase to a temperature above the dew point of the vapour, the innovation compared with conventional jet mills consists in flushing of classifier gap 8a and/or shaft lead-through 35b with compressed gases of low energy. The peculiarity of this design is precisely the combination of the use of these compressed low-energy gases with the high-energy superheated steam, with which the mill is fed through the milling jet inlets, in particular milling nozzles or milling nozzles present therein. Thus, high-energy media and low-energy media are simultaneously used.

In the embodiment according to both FIGS. 10 and 11 on the one hand and 8 and 9 on the other hand, the classifier housing 21 receives the tubular outlet nozzle 20 which is arranged axially identically with the classifying wheel 8 and rests with its upper end just below the cover disc 33 of the classifying wheel 8, which cover disc is on the outflow side, but without being connected thereto. Mounted axially in coincidence at the lower end of the outlet nozzle 20 in the form of a tube is an outlet chamber 41 which is likewise tubular but the diameter of which is substantially larger than the diameter of the outlet nozzle 20 and in the present working example is at least twice as large as the diameter of the outlet nozzle 20. A substantial jump in diameter is therefore present at the transition between the outlet nozzle 20 and the outlet chamber 41. The outlet nozzle 20 is inserted into an upper cover plate 42 of the outlet chamber 41. At the bottom, the outlet chamber 41 is closed by a removable cover 43. The assembly comprising outlet nozzle 20 and outlet chamber 41 is held in a plurality of support arms 44 which are distributed uniformly in a star-like manner around the circumference of the assembly, connected firmly at their inner ends in the region of the outlet nozzle 20 to the assembly and fixed with their outer ends to the classifier housing 21.

The outlet nozzle 20 is surrounded by a conical annular housing 45, the lower, larger external diameter of which corresponds at least approximately to the diameter of the outlet chamber 41 and the upper, smaller external diameter of which corresponds at least approximately to the diameter of the classifying wheel 8. The support arms 44 end at the conical wall of the annular housing 45 and are connected firmly to this wall, which in turn is part of the assembly comprising outlet nozzle 20 and outlet chamber 41.

The support arms 44 and the annular housing 45 are parts of the flushing air device (not shown), the flushing air preventing the penetration of material from the interior of the classifier housing 21 into the gap between the classifying wheel 8 or more exactly the lower cover disc 3 thereof and the outlet nozzle 20. In order to enable this flushing air to reach the annular housing 45 and from there the gap to be kept free, the support arms 44 are in the form of tubes, with their outer end sections led through the wall of the classifier housing 21 and connected via an intake filter 46 to a flushing air source (not shown). The annular housing 45 is closed at the top by a perforated plate 47 and the gap itself can be adjustable by an axially adjustable annular disc in the region between perforated plate 47 and lower cover disc 33 of the classifying wheel 8.

The outlet from the outlet chamber 41 is formed by a fines discharge tube 48 which is led from the outside into the classifier housing 21 and is connected tangentially to the outlet chamber 41. The fines discharge tube 48 is part of the product outlet 6. A deflection cone 49 serves for cladding the entrance of the fines discharge tube 48 at the outlet chamber 41.

At the lower end of the conical housing end section 38, a classifying air entry spiral 50 and a coarse material discharge 51 are coordinated in horizontal arrangement with the housing end section 38. The direction of rotation of the classifying air entry spiral 50 is in the opposite direction to the direction of rotation of the classifying wheel 8. The coarse material discharge 51 is detachably coordinated with the housing end section 38, a flange 52 being coordinated with the lower end of the housing end section 38 and a flange 53 with the upper end of the coarse material discharge 51, and both flanges 52 and 53 in turn being detachably connected to one another by known means when the air classifier 7 is ready for operation.

The dispersion zone to be designed is designated by 54. Flanges worked (bevelled) on the inner edge, for clean flow, and a simple lining are designated by 55.

Finally, an interchangeable protective tube 56 is also mounted as a closure part on the inner wall of the outlet nozzle 20, and a corresponding interchangeable protective tube 57 can be mounted on the inner wall of the outlet chamber 41.

At the beginning of operation of the air classifier 7 in the operating state shown, classifying air is introduced via the classifying air entry spiral 50 into the air classifier 7 under a pressure gradient and with an entry velocity chosen according to the purpose. As a result of introducing the classifying air by means of a spiral, in particular in combination with the conicity of the housing end section 38, the classifying air rises spirally upwards in the region of the classifying wheel 8. At the same time, the "product" comprising solid particles of different mass is introduced via the product feed nozzle 39 into the classifier housing 21. Of this product, the coarse material, i.e. the particle fraction having a greater mass, moves in a direction opposite to the classifying air into the region of the coarse material discharge 51 and is provided for further processing. The fines, i.e. the particle fraction having a lower mass, is mixed with the classifying air, passes radially from the outside inwards through the classifying wheel 8 into the outlet nozzle 20, into the outlet chamber 41 and finally via a fines outlet tube 48 into a fines outlet 58, and from there into a filter in which the operating medium in the form of a fluid, such as, for example air, and fines are separated from one another. Coarser constituents of the fines are removed radially from the classifying wheel 8 by centrifugal force and mixed with the coarse material in order to leave the classifier housing 21 with the coarse material or to circulate in the classifier housing 21 until it has become fines having a particle size such that it is discharged with the classifying air.

Owing to the abrupt widening of the cross section from the outlet nozzle 20 to the outlet chamber 41, a substantial reduction in the flow velocity of the fines/air mixture takes place there. This mixture will therefore pass at a very low flow velocity through the outlet chamber 41 via the fines outlet tube 48 into the fines outlet 58 and produce only a small amount of abraded material on the wall of the outlet chamber 41. For this reason, the protective tube 57 is also only a very precautionary measure. The high flow velocity in the classifying wheel 8 for reasons relating to a good separation technique, also prevails, however, in the discharge or outlet nozzle 20, and the protective tube 56 is therefore more important than the protective tube 57. Particularly preferred is the jump in diameter with a diameter increase at the transition from the outlet nozzle 20 into the outlet chamber 41.

The air classifier 7 can besides in turn be readily maintained as a result of the subdivision of the classifier housing 21 in the manner described and the coordination of the classifier components with the individual part-housings, and components which have become damaged can be changed with relatively little effort and within short maintenance times.

While the classifying wheel 8 with the two cover discs 32 and 33 and the blade ring 59 arranged between them and having the blades 34 is shown in the schematic diagram of FIGS. 10 and 8 in the already known, customary form with parallel cover discs 32 and 33 having parallel surfaces, the classifying wheel 8 is shown in FIGS. 11 and 9 for a further working example of the air classifier 7 of an advantageous further development.

This classifying wheel 8 according to FIGS. 11 and 9 contains, in addition to the blade ring 59 with the blades 34, the upper cover disc 32 and the lower cover disc 33 an axial distance away therefrom and located on the outflow side, and is rotatable about the axis 40 of rotation and thus the longitudinal axis of the air classifier 7. The diametral dimension of the classifying wheel 8 is perpendicular to the axis 40 of rotation, i.e. to the longitudinal axis of the air classifier 7, regardless of whether the axis 40 of rotation and hence said longitudinal axis are perpendicular or horizontal. The lower cover disc 33 on the outflow side concentrically encloses the outlet nozzle 20. The blades 34 are connected to the two cover discs 33 and 32. The two cover discs 32 and 33 are now, in contrast to the prior art, conical, preferably such that the distance of the upper cover disc 32 from the cover disc 33 on the outflow side increases from the ring 59 of blades 34 inwards, i.e. towards the axis 40 of rotation, and does so preferably continuously, such as, for example, linearly or non-linearly, and more preferably so that the area of the cylinder jacket through which flow takes place remains approximately constant for every radius between blade outlet edges and outlet nozzle 20. The outflow velocity which decreases owing to the decreasing radius in known solutions remains at least approximately constant in this solution.

In addition to that variant of the design of the upper cover disc 32 and of the lower cover disc 33 which is explained above and in FIGS. 11 and 9, it is also possible for only one of these two cover discs 32 or 33 to be conical in the manner explained and for the other cover disc 33 or 32 to be flat, as is the case for both cover discs 32 and 33 in relation to the working example according to FIG. 10. In particular, the shape of the cover disc which does not have parallel surfaces can be such that the area of the cylinder jacket through which flow takes place remains at least approximately constant for every radius between blade outlet edges and outlet nozzle 20.

The silicas of the present invention can be used in sealants, particularly in silicone rubber and silicone sealants and with particular preference in RTV-1K sealants. Their application is possible in various crosslinking systems, e.g. acetoxy-crosslinking, alkoxy-crosslinking and oxime-crosslinking. These systems find application, for example in the building industry as joint-sealants, in the automotive industry as adhesives and sealants and as coating compositions for textile fabrics, for example.

Having generally described this invention, a further understanding can be obtained by reference to certain specific examples which are provided herein for purposes of illustration only, and are not intended to be limiting unless otherwise specified.

EXAMPLES

The reaction conditions and the physical/chemical data of the precipitated silicas of the present invention are determined by means of the following methods:

Determining Filter Cake Solids Content

In accordance with this method the solids content of filter cakes was determined by removal of the volatile fractions at 105° C.

For this purpose 100.00 g of the filter cake were weighed out (initial mass E) into a dry, tared porcelain dish (20 cm diameter). The filter cake was broken up with a spatula if necessary to give loose lumps of not more than 1 cm³. The sample was dried to constant weight in a drying cabinet at 105±2° C. Subsequently the sample was cooled to room temperature in a desiccator cabinet with silica gel as desiccant. The final mass A was determined gravimetrically.

The solids content (SC) in % by weight was determined in accordance with SC=A/E*100%, where A=final mass in g and E=initial mass in g.

Determining Precipitation Suspension Solids Content

The solids content of the precipitation suspension was determined gravimetrically after the sample had been filtered.

100.0 ml of the homogenized precipitation suspension ($V_{suspension}$) were measured off at room temperature with the aid of a measuring cylinder. The sample was filtered through a circular filter (TYP 572, Schleicher & Schuell) in a porcelain suction filter unit, but was not sucked dry, so as to prevent cracking of the filter cake. Subsequently the filter cake was washed with 100.0 ml of distilled water. The washed filter cake was transferred to a tared porcelain dish and dried to constant weight in a drying oven at 105±2° C. The weight of the dried silica ($m_{sample}$) was determined after cooling to room temperature.

The solids content was determined in accordance with: solids content in g/l=($m_{sample}$ in g)/($V_{suspension}$ in l).

Determining Silica-Feed Solids Content

The silica feed was dried to constant weight in an IR drier. The loss on drying consisted predominantly of water moisture.

2.0 g of silica feed were charged to a tared aluminum dish and the lid of the IR drying unit (Mettler, type LP 16) was closed. After the start button had been pressed, drying of the suspension at 105° C. commenced, and was ended automatically when the weight decreased per unit time falls below a value of 2 mg/(120 s).

The weight decrease in % by weight was displayed directly by the instrument when the 0-100% mode was selected. The solids content was given by solids content in % by weight=100%−weight decrease in %.

Determining pH

The pH of the silica, as a 5% by weight aqueous suspension, was determined at room temperature in a method based on DIN EN ISO 787-9. In contrast to the specifications of the aforementioned standard, the initial masses were changed (5.00 g of silica to 100 ml of deionized water).

Determining Electrical Conductivity

The electrical conductivity of silica, as a 4% by weight aqueous suspension, was determined at room temperature in a method based on DIN EN ISO 787-14. In contrast to the specifications of the aforementioned standard, the initial masses were changed (4.00 g of silica to 100 ml of deionized water).

Determining the Moisture Content or Loss on Drying

The moisture content of silica was determined in accordance with ISO 787-2 after 2 hour drying in a forced-air drying cabinet at 105° C. This loss on drying was composed predominantly of moisture water.

Determining the Loss on Ignition

By this method the loss in weight of silica was determined in a method based on DIN EN ISO 3262-1 at 1000° C. At this temperature, water bound physically and chemically, and also other volatile constituents escaped. The moisture content (LD) of the sample investigated was determined by the above-described method "Determining the moisture content or loss on drying", based on DIN EN ISO 787-2.

0.5 g of the pulverulent, spherical or granular silica was weighed out to an accuracy of 0.1 mg into a tared porcelain crucible which had been purified beforehand by calcining (initial mass E). The sample was heated in a muffle furnace at 1000±50° C. for 2 h. The porcelain crucible was subsequently cooled to room temperature in a desiccator with silica gel as desiccant. The final mass A was determined gravimetrically.

The loss on ignition (DIN) LOI in % by weight was obtained in accordance with

LOI=(1 −A/F)*100.

F denotes the corrected initial mass in g based on dried matter, and was calculated according to

F=E*(1−LD/100).

In the calculations A denotes final mass in g, E denotes initial mass in g and LD denotes loss on drying, in % by weight.

Determining the BET Surface Area

The specific nitrogen surface (called the BET surface area below) of the pulverulent, spherical or granular silica was determined by a method based on ISO 5794-1/Annexe D using the TRISTAR 3000 instrument (from Micromeritics) in accordance with the multipoint determination of DIN-ISO 9277.

Determining the CTAB Surface Area

The method was based on the adsorption of CTAB (N-hexadecyl-N,N,N-trimethylammonium bromide) on the "external" surface of the silica, in a method based on ASTM 3765 or NFT 45-007 (section 5.12.1.3).

CTAB was adsorbed in aqueous solution with stirring and ultrasound treatment. Excess, unadsorbed CTAB was determined by back-titration with SDSS (sodium dioctylsulphosuccinate solution, "Aerosol OT" solution) using a titroprocessor, the endpoint being given by the turbidity maximum of the solution and determined using a phototrode. The temperature throughout all of the operations conducted was 23-25° C., to prevent crystallization of CTAB. The back-titration was based on the following reaction equation:

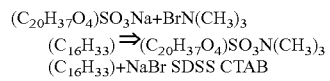

Apparatus

Mettler Toledo DL55 titroprocessor and Mettler Toledo DL70 titroprocessor, each equipped with pH electrode, Mettler, type DG 111 and phototrode, Mettler, type DP 550
100 ml polypropylene titration beaker
Glass titration vessel, 150 ml, with lid
Pressure filtration device, 100 ml capacity
Cellulose nitrate membrane filter, pore size 0.1 μm, 47 mm Ø, e.g. Whatman (Order No. 7181-004)

Reagents

The solutions of CTAB ($C_{CTAB}$=0.015 mol/l in deionized water) and SDSS (concentration=0.00423 mol/l in deionized water) were purchased in ready-to-use form (Bernd Kraft GmbH, 47167 Duisberg: Order No. 6056.4700 CTAB solution of concentration 0.015 mol/l; Order No. 6057.4700 SDSS solution 0.00423 mol/l), stored at 25° C. and used within one month.

Procedure

1. Blank Titration

The consumption of SDSS solution for titrating 5 ml of CTAB solution should be checked 1× daily before each series of measurements. This was done by setting the phototrode, before beginning the titration, at 1000±20 mV (corresponding to a transparency of 100%).

Precisely 5.00 ml of CTAB solution were pipetted into a titration beaker and 50.0 ml of deionized water were added. Titration with SDSS solution was carried out with stirring by the measurement method familiar to the skilled person, using the DL 55 titroprocessor, until the solution reaches maximum turbidity. The consumption $V_A$ of SDSS solution in ml was determined. Each titration should be performed in triplicate.

2. Adsorption 10.0 g of the pulverulent, spherical or granular silica with a moisture content of 5±2% by weight (if appropriate, the moisture content was adjusted by drying at 105° C. in a drying cabinet or by uniform wetting) were comminuted for 30 seconds using a mill (Krups, model KM 75, article no. 2030-70). Precisely 500.0 mg of the comminuted sample (initial mass E) were transferred to a 150 ml titration vessel with magnetic stirrer rod and precisely 100.0 ml of CTAB solution ($T_1$) were metered in. The titration vessel was closed with a lid and stirred using an Ultra Turrax T 25 stirrer (stirrer shaft KV-18G, 18 mm diameter) at 18 000 rpm for not more than 1 minute until wetting was complete. The titration vessel was screwed on to the DL 70 titroprocessor and the pH of the suspension was adjusted with KOH (0.1 mol/l) to a figure of 9±0.05.

The suspension was sonicated for 4 minutes in the titration vessel in an ultrasound bath (Bandelin, Sonorex RK 106 S, 35 kHz, 100 W effective and 200 W peak output) at 25° C. This was followed immediately by pressure filtration through a membrane filter under a nitrogen pressure of 1.2 bar. The initial fraction of 5 ml was discarded.

3. Titration 5.00 ml of the remaining filtrate were pipetted into a 100 ml titration beaker and made up to 50.00 ml with deionized water. The titration beaker was screwed on to the DL 55 titroprocessor and titrated with SDSS solution, with stirring, until maximum turbidity was reached. The consumption $V_B$ of SDSS solution, in ml, was determined. Each titration should be performed in triplicate.

Calculation $$CTAB(\text{without moisture correction}) = \frac{V_A - V_B}{V_A} * \frac{C_{CTAB} * M_{CTAB} * T_1 * P}{E}$$

VA=consumption of SDSS solution in ml in titrating the blank sample
VB=consumption of SDSS solution in ml when using the filtrate
$C_{CTAB}$=concentration of CTAB solution in mol/l
$M_{CTAB}$=molar mass of CTAB=364.46 g/mol
$T_1$=amount of CTAB solution added in l
P=surface occupancy of CTAB=578.435 m²/g
E=initial mass of silica The CTAB surface area was based on the anhydrous silica, which was why the following correction was made.

$$CTAB = \frac{CTAB(\text{without moisture correction}) \text{ in m}^2/\text{g} \; 100\%}{100\% \text{ moisture content in \%}}$$

% in the above formula is in % by weight. The moisture content of the silica was determined in accordance with the above-described method "Determining the Moisture Content".

Determining the DBP Absorption

The DBP absorption (DBP number), which was a measure of the absorbency of the precipitated silica, was determined by a method based on the DIN 53601 standard, as follows:

12.50 g of pulverulent or spherical silica with a moisture content of 0-10% by weight (the moisture content was adjusted, if appropriate, by drying at 105° C. in a drying cabinet) were introduced into the kneader chamber (article number 279061) of the Brabender Absorptometer "E" (without damping of the outlet filter of the torque sensor). In the case of granules, the sieve fraction from 1 to 3.15 mm (stainless steel sieves from Retsch) was used (by gently pressing the granules with a plastic spatula through the sieve with pore size of 3.15 mm). With continual mixing (kneader paddles rotating at a speed of 125 rpm), dibutyl phthalate was added dropwise to the mixture at a rate of 4 ml/min and at room temperature by means of the Brabender T 90/50 Dosimat. The incorporation of the DBP by mixing takes place with only a small amount of force, and was monitored by means of the digital display. Towards the end of the determination the mixture becomes pasty which was indicated by a sharp increase in the required force. At a display reading of 600 digits (torque of 0.6 Nm) an electrical contact shuts off both the kneader and the DBP feed. The synchronous motor for the DBP feed was coupled to a digital counter, so that the consumption of DBP in ml can be read off.

The DBP absorption was reported in g/(100 g) and was calculated using the following formula:

$$DBP = \frac{V * D * 100}{E} * \frac{g}{100 \text{ g}} + K$$

where
DBP=DBP absorption in g/(100 g)
V=consumption of DBP in ml
D=density of DBP in g/ml (1.047 g/ml at 20° C.)
E=initial mass of silica in g
K=correction value as per moisture correction table in g/(100 g)

The DBP absorption was defined for the anhydrous, dried silica. If moisture precipitated silicas were used it was necessary to take into account the correction value K for calculating the DBP absorption. This value can be determined using the correction table below: for example, silica having a water content of 5.8% by weight would require an add-on of 33 g/(100 g) for the DBP absorption. The moisture content of the silica was determined in accordance with the method "Determining the Moisture Content or Loss on Drying".

Moisture correction table for dibutyl phthalate absorption (anhydrous)

| % by weight moisture | % by weight moisture .0 | .2 | .4 | .6 | .8 |
|---|---|---|---|---|---|
| 0 | 0 | 2 | 4 | 5 | 7 |
| 1 | 9 | 10 | 12 | 13 | 15 |
| 2 | 16 | 18 | 19 | 20 | 22 |
| 3 | 23 | 24 | 26 | 27 | 28 |
| 4 | 28 | 29 | 29 | 30 | 31 |
| 5 | 31 | 32 | 32 | 33 | 33 |
| 6 | 34 | 34 | 35 | 35 | 36 |
| 7 | 36 | 37 | 38 | 38 | 39 |
| 8 | 39 | 40 | 40 | 41 | 41 |
| 9 | 42 | 43 | 43 | 44 | 44 |
| 10 | 45 | 45 | 46 | 46 | 47 |

IR Determination

By means of IR spectroscopy it was possible to ascertain the different kinds of SiOH groups (isolated, bridged, +H$_2$O). To determine the intensities of the different silanol groups, the silicas were subjected to measurement in the form of powder layers. The absorbance values of the different silanol groups were divided (standardized) by the absorbance value of the SiO combination vibration band at 1870 cm$^{-1}$.

The IR-spectroscopic determination takes place by means of a Bruker IFS 85 FR-IR spectrometer. Measurement takes place using a transparent NaCl monocrystal disc (round d=25 mm, h=5 mm) from K. Korth, Kiel, Germany, a 0.5 mm Teflon spacer and a mount for the discs. The spacer was placed on one clean, polished transparent NaCl monocrystal disc. The sample material was dusted on between the spacer and was covered with a further clean, polished transparent NaCl monocrystal disc; there must be no air bubbles included. The two transparent NaCl monocrystal discs with the powder layer were clamped into the sample mount. The sample mount was brought into the IR beam path and the sample chamber was closed. Prior to the measurement, the sample chamber was flushed with air cleaned to remove steam and carbon dioxide. In the alignment mode an "Align" was carried out, and measurement was commenced.

Measurement was carried out using the following parameters:

| | |
|---|---|
| Resolution: | 2 cm$^{-1}$ |
| Scanner speed: | 6; 10.51 Hz |
| Measuring range: | 4500 cm$^{-1}$ to 100 cm$^{-1}$ |
| Apodization function: | triangular |
| Number of scans: | 128 |

The spectrum was expressed, in the wave number range from 4000 to 1400 cm$^{-1}$, in continuous wave numbers.

The SiOH$_{isolated}$ absorbance ratio was determined as follows (FIG. 1):

First of all, two baselines were set. This was done by applying two tangents to the absorption plot. The first tangent (1st baseline) touches the absorption plot first in the region from 4000 cm$^{-1}$ to 3800 cm$^{-1}$ and secondly in the region from 3000 cm$^{-1}$ to 2100 cm$^{-1}$. It should be ensured that the tangent does not intersect the absorption plot either in the region from 4000 cm$^{-1}$ to 3800 cm$^{-1}$ or in the region from 3000 cm$^{-1}$ to 2100 cm$^{-1}$. The second tangent (2nd baseline) touches the absorption plot first in the region from 2200 cm$^{-1}$ to 2000 cm$^{-1}$ and secondly in the region from 1850 cm$^{-1}$ to 1650 cm$^{-1}$. It should be ensured that the tangent does not intersect the absorption plot either in the region from 2200 cm$^{-1}$ to 2000 cm$^{-1}$ or in the region from 1850 cm$^{-1}$ to 1650 cm$^{-1}$.

After the baselines have been set, a perpendicular line was taken down from the maximum of the bands in question (3750 and 1870 cm$^{-1}$) to the respective baseline, and a measurement was made with the respective heights from the maximum to the baseline, in mm. A ratio was formed as follows:

$$\text{Absorption ratio (SiOH}_{isolated}) = \frac{\text{height from maximum to base line in mm at 3750 cm}^{-1}}{\text{height from maximum to base line in mm at 1870 cm}^{-1}}$$

For each sample six IR spectra were recorded, measurement taking place in each case with new sample material. Each IR spectrum was evaluated five times in accordance with the procedure described above. The absorbance ratio (SiO$_{isolated}$) was reported, finally, as the average value of all the evaluations.

Determining the Contact Angle

The contact angle was determined as described in W. T. Yen, R. S. Chahal, T. Salman, Can. Met. Quart., Vol. 12, No. 3, 1973.

Determining the Silanol Group Density

First of all the moisture content of the silica sample was determined in accordance with the section "Determining the Moisture Content or Loss on Drying". Thereafter 2-4 g of the sample (to an accuracy of 1 mg) were transferred to a pressure-tight glass apparatus (glass flask with dropping funnel) with a pressure measurement means attached. In this apparatus it was dried under reduced pressure (<1 hPa) at 120° for 1 h. At room temperature then, approximately 40 ml of a degassed 2% strength solution of LiAlH$_4$ in diglyme was added dropwise from the dropping funnel. If appropriate, further solution was added dropwise until no further increase in pressure was observed. The increase in pressure as a result of the hydrogen evolved when the LiAlH$_4$ reacts with the silanol groups of the silica was determined by way of pressure measurement (with the volume known as a result of calibration of the apparatus prior to measurement) to an accuracy of <1 hPa. From the increase in pressure it was possible, by calculation using the general gas equation, to work back to the silanol group concentration of the silica, taking into account the moisture content of the silica. The influence of the vapor pressure of the solvent should be corrected correspondingly. The silanol group density was calculated as follows:

$$\text{Silanol group density} = \frac{\text{silanol group concentration}}{BET \text{ surface area}}$$

Determining the Particle Size Distribution By Means of Laser Diffraction

The particle distribution was determined in accordance with the principle of laser diffraction on a laser diffractometer (Horiba, LA-920).

First of all the silica sample was dispersed in 100 ml of water without additional dispersing additives in a 150 ml glass beaker (diameter: 6 cm) in such a way as to give a dispersion having a weight fraction of 1% by weight SiO$_2$. This dispersion was then dispersed using an ultrasonic probe (Dr. Hielscher UP400s, Sonotrode H7) for a duration of 5 minutes intensely (300 W, without pulsing). For this purpose the ultrasound probe was mounted such that its lower end was immersed to a distance of approximately 1 cm above the base of the glass beaker. Immediately following the dispersing operation the particle size distribution of a sample of the ultrasonicated dispersion was determined using a laser diffractometer (Horiba LA-920). For the evaluation, using the standard software supplied with the Horiba LA-920, a refractive index of 1.09 was selected.

All measurements take place at room temperature. The particle size distribution and also the relevant variables such as, for example, the particle size $d_{90}$ were automatically calculated and depicted in graph form by the instrument. Attention should be paid to the notes in the operating instructions.

Determining the Modified Tapped Density

With the "conventional" tapped density determination of DIN EN ISO 787-11, the result can be falsified by the fact that the silica had already undergone preliminary compaction in the course, for example, of being packed. In order to rule this out, a "modified tapped density" was determined for the silicas of the present invention.

A porcelain suction filter (nominal size 110, diameter=12 cm, height=5.5 cm) fitted with a circular filter (e.g. type 598, Schleicher+Schull) was filled loosely with silica to approximately 1 cm from the top edge, and was covered with elastic film (Parafilm®). The shape and dimensions of the elastic film were to be selected such that it finishes very closely or completely flush with the edge of the porcelain suction filter unit. The unit was mounted on a suction bottle and then a vacuum of −0.7 bar was applied for a period of 5 minutes. In the course of this operation, the silica was compacted uniformly by virtue of the film under suction. Then air was cautiously readmitted and the resulting silica plaque was removed from the filter unit by being tipped forcefully into a porcelain dish.

The slightly precomminuted material was redispersed uniformly (in the manner of a silica/air aerosol) via a centrifugal mill (ZM1, Retsch, 0.5 mm screen insert, speed setting 1, without cyclone, without internal funnel insert) with an internal collecting dish (the silica (starting material) was introduced slowly—spatula by spatula—into the mill feed; the internal product collection dish should never become completely full). During this operation the power consumption of the mill should not exceed 3 amperes. This operation was less a conventional grinding than a defined loosening of the silica structure (of air-jet-milled silicas, for example), since the energy input here was substantially weaker than in the case of jet milling.

5 g of the resulting material were weighed out to an accuracy of 0.1 g into the 250 ml volumetric cylinder of the jolting volumeter (STAV 2003 from Engelsmann). In a method based on DIN ISO 787-11, after jolting 1250 times, the resulting volume of the silica, in ml, was read off on the scale.

$$\text{Modified tapped density in } [g/l] = \frac{5 \text{ g}}{\text{tapped volume in [ml]}} \times \frac{1000 \text{ ml}}{1 l}$$

The examples below were intended to illustrate the present invention without restricting its scope.

The water glass and the sulphuric acid used at various points in the directions of the examples below were characterized as follows:

| Water glass: | density 1.348 kg/l, 27.0% by weight $SiO_2$, 8.05% by weight $Na_2O$ |
| --- | --- |
| Sulphuric acid: | density 1.83 kg/l, 94% by weight |

EXAMPLE 1

A 2 m³ precipitating vessel (diameter 160 cm) with inclined base, MIG inclined-blade stirrer system and Ekato fluid shear turbine was charged with 1679 l of deionized water and this initial charge was heated to 92° C. After the temperature had been reached, and over a period of 100 minutes, water glass was metered in at a rate of 3.93 kg/min, and sulphuric acid was metered in at a rate of 0.526 kg/min with stirring. The rate of metering of sulphuric acid must be corrected if appropriate so that during the entire precipitation time a pH of 8.5 was maintained. Thereafter the water glass feed was shut off, with retention of the temperature, and with the same rate of metering of sulphuric acid the precipitation suspension was acidified to a pH of 3. The precipitation suspension had a solids content of 54 g/l.

The resulting suspension was filtered with a membrane filter press and the filter cake was washed with deionized water until the wash water was found to have a conductivity of <1 mS/cm. The filter cake then had a solids content of <20% by weight.

Before drying by means of a spray drier, the filter cake was redispersed with deionized water to a solids content of 8%-13% by weight, during which it must be ensured that it was not exposed to any strong shearing forces. The metering of the liquefied filter cake into the spray drier takes place in such a way that the temperature measured at the drier outlet was approximately 150° C.

Subsequently the material was treated in a fluidized-bed reactor (expanded fluidized bed height approximately 1.5 m, fluidized-bed diameter approximately 0.5 m). For this purpose the following conditions should be observed:

First of all, 30 kg of the spray-dried powder were introduced into the fluidized-bed reactor with fluidizing base. The fluidizing base was traversed by a gas mixture comprising dry nitrogen and dry air. These two gases were metered prior to their entry into the reactor in such a way that a resulting oxygen content of 6% by volume was not exceeded and in such a way as to give a fluidization velocity in the reactor of 0.05 m/s. The reactor was then heated from room temperature to 450° C. The flow rates of the fluidizing gas should be regulated during the heating phase such that the fluidization velocity in the reactor remains constant at 0.05 m/s.

After 450° C. had been reached, a preheated gas mixture of steam, nitrogen and air was fed into the reactor for a period of 3 hours. The three components were mixed so as to set a steam concentration of 50% by volume and an oxygen content of 3% by volume. Volumes of nitrogen and of air were adapted so that, again, a fluid gas velocity of 0.05 m/s comes about.

Thereafter the addition of steam was interrupted. Nitrogen and air volumes were adapted so as to result, again, in a fluidization velocity of 0.05 m/s and an oxygen content of approximately 6% by volume.

After at least five times the volume of dry process gas had been passed through the fluidized-bed reactor, after the interruption of the steam supply, the product was cooled to room temperature in a dry process gas atmosphere. Cooling takes place with fluidization in a nitrogen/air mixture in which the oxygen content was approximately 6% by volume. In the cooling phase, particular care should be taken to ensure that at this point there was no longer any steam present.

Figure 2:
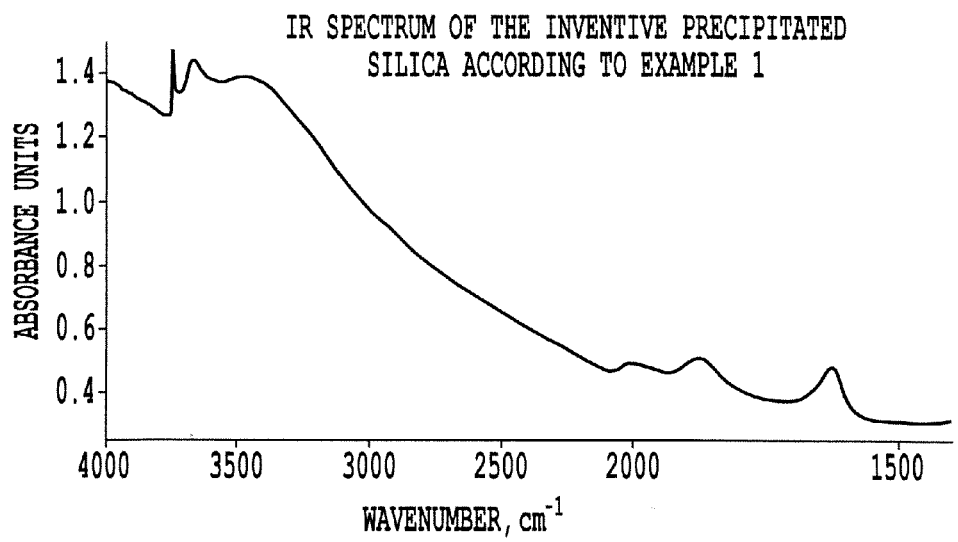
FIG. 2 is an IR spectrum of precipitated silica according to the present invention (Example 1).

Following the surface treatment in the fluidized bed, the material was ground on a fluid-bed opposed-jet mill AFG 50 from Alpine. The chemicophysical data of Example 1 were listed in Table 1 and an IR spectrum was depicted in FIG. 2.

EXAMPLE 2

A 2 m³ precipitating vessel (diameter 160 cm) with inclined base, MIG inclined-blade stirrer system and Ekato fluid shear turbine was charged with 1680 l of deionized water and this initial charge was heated to 92° C. After the temperature had been reached, and over a period of 100 minutes, waterglass was metered in at a rate of 3.93 kg/min, and sulphuric acid was metered in, at a rate of 0.526 kg/min with stirring. The rate of metering of sulphuric acid must be corrected if appropriate so that during the entire precipitation time a pH of 8.5 was maintained. Thereafter the waterglass feed was shut off, and with the same rate of metering of sulphuric acid, and still at 92° C., the precipitation suspension was acidifed to a pH of 3. The precipitation suspension at this point had a solids content of 54 g/l.

The resulting suspension was filtered with a membrane filter press and the filter cake was washed with deionized water until the wash water was found to have a conductivity of <1 mS/cm. The filter cake then had a solids content of <20% by weight.

Before drying by means of a spray drier, the filter cake was redispersed with deionized water to a solids content of 8%-13% by weight, during which it must be ensured that it was not exposed to any shearing forces. The metering of the liquefied filter cake into the spray drier takes place in such a way that the temperature measured at the drier outlet was approximately 150° C.

The spray-dried material was subjected to preliminary grinding via a mechanical beater mill to an average particle size of 10-12 μm. After this preliminary grinding, the material was subjected to ultrafine grinding on a steam-operated fluid-bed opposed-jet mill at a superatmospheric pressure of 38 bar. Details of the grinding system (mill) and of the grinding method used can be found in DE 10 2006 048 850.4 and also in the description which follows. German patent applications DE 102006024591.1 filed May 26, 2006, DE 102007004757.8, filed Jan. 31, 2007 and DE 102006048850.4, filed Oct. 16, 2006, were incorporated herein by reference.

In preparation for actual grinding with superheated steam, a fluid-bed opposed-jet mill as shown in FIG. 7, with an integrated dynamic air classifier as shown in FIGS. 9 and 9, was first heated via the two heating openings or nozzles 5a (of which only one was shown in FIG. 7), which were charged with hot compressed air at 10 bar and 160° C., until the mill exit temperature was approximately 105° C.

For the separation of the ground material, a filter system was connected downstream of the mill (but not shown in FIG. 7), its filter housing being heated in the lower third indirectly via attached heating coils by means of 6 bar saturated steam, likewise for the purpose of preventing condensation. All of the apparatus surfaces in the region of the mill, the separating filter, and the supply lines for steam and hot compressed air have special insulation.

After the heating temperature had been reached, the supply of hot compressed air to the heating nozzles was shut off and the charging of the three grinding nozzles with the grinding medium of superheated steam (37.9 bar (abs), 325° C.) was commenced.

In order to protect the filter means used in the separating filter, and also in order to set a defined level of residual water in the ground material (see Table 1), water was introduced in the starting phase and during grinding, into the grinding chamber of the mill, via a two-fluid nozzle operated with compressed air, as a function of the mill exit temperature.

The following mill configurations and operating parameters were used: grinding nozzle diameters=2.5 mm, nozzle type=Laval, number of nozzles=3 units; internal mill pressure=1.306 bar (abs.), grinding medium entry pressure=37.9 bar (abs.), grinding medium entry temperature=325° C., grinding medium mill exit temperature=149.8° C., classifier speed=3500 min$^{-1}$, classifier flow=54.5 A %, outlet port diameter (immersed pipe diameter)=100 mm.

Product feed was commenced when the abovementioned operational parameters were constant. The feed quantity was regulated as a function of the classifier flow which comes about. The classifier flow regulates the feed quantity such that it was not possible to exceed approximately 70% of the nominal flow.

The feed for material to be grinded (milled) (4) which functions here was a speed-regulated bucket wheel which meters the feed material from a reservoir container via a cyclical lock, which serves as a barometric endpoint, into the grinding chamber, which was at superatmospheric pressure.

The coarse material was comminuted in the expanding steam jets (grinding gas). Together with the depressurized grinding gas, the product particles ascend in the centre of the mill vessel to the classifying wheel. Depending on the classifier speed and grinding steam quantity which have been set, the particles whose fineness was sufficient enter along with the grinding steam into the fines exit, and from there they pass into the downstream separating system, while particles which were too coarse pass back into the grinding zone and were subjected to a repeat comminution. The discharge of the separated fines from the separation filter into the subsequent silo storage and bagging operation takes place by means of a bucket-wheel lock.

The grinding pressure of the grinding gas that obtains at the grinding nozzles, and the resulting volume of grinding gas, in conjunction with the speed of the dynamic paddle wheel classifier, determine the fineness of the particle-size distribution function and also the upper particle-size limit.

The material was ground to the particle size defined in Table 1 by the $d_{90}$ value and by the fraction of particles <1 μm.

Subsequently the material was treated in a fluidized-bed reactor. For this purpose the following conditions should be observed:

First of all, 5 kg of the powder were introduced into the fluidized-bed reactor with fluidizing base. The fluidizing base was traversed by a gas mixture comprising dry nitrogen and dry air. These two gases were metered prior to their entry into the reactor in such a way that a resulting oxygen content of 6% by volume was not exceeded and in such a way as to give a fluidization velocity in the reactor of 0.05 m/s. The reactor was then heated from room temperature to 600° C. The flows of the fluidizing gas should be regulated in the heating phase such that the fluidization velocity in the reactor remains constant at 0.05 m/s.

After 600° C. had been reached, a preheated gas mixture of steam and nitrogen was fed into the reactor for a period of 2 hours. The two components were mixed so as to set a steam concentration of 90% by volume and a nitrogen content of 10% by volume. The gas volumes were adapted so that, again, a fluid gas velocity of 0.05 m/s comes about.

Thereafter the addition of steam was interrupted, and for 30 minutes pure nitrogen at 600° C. was passed through the fluidized-bed reactor.

The material was then cooled to room temperature in a stream of dry nitrogen and was discharged from the reactor. In the cooling phase, particular care should be taken to ensure that at this point there was no longer any steam present.

Figure 6:
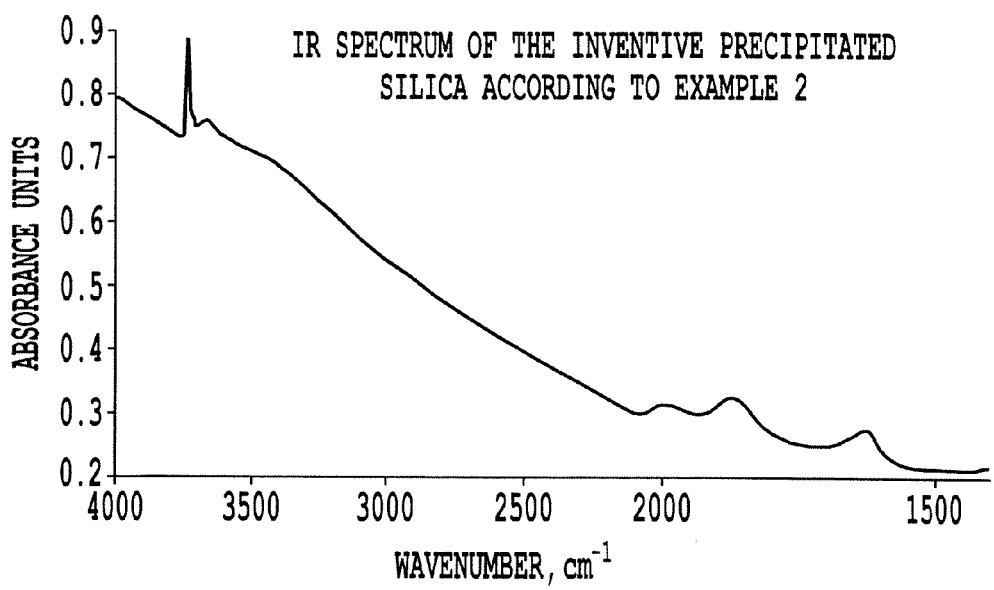
FIG. 6 shows an IR spectrum of the precipitated silica according to the present invention (Example 2).

The chemicophysical data of Example 2 were listed in Table 1 and an IR spectrum was depicted in FIG. 6.

COMPARATIVE EXAMPLES 1-2

The following commercially available silicas were analyzed (see Table 1) and incorporated into sealants in Example 4:

COMPARATIVE EXAMPLE 1

Siloa™ 72 X (Rhodia AG)

COMPARATIVE EXAMPLE 2

Ultrasil® VN 3 (Degussa AG)

temperature. Preparation takes place at room temperature and at a relative humidity of 40% to 60%.

A planetary dissolver (from H. Linden, type LPMD 2SP) equipped with a 2 l stirring vessel with jacket, cooling water connection and independently controllable planetary drive and a dissolver drive was charged with silicone polymer, plasticizer (silicone oil) and crosslinker and this initial charge was homogenized for 1 minute at a speed of 50 $min^{-1}$ (planetary drive) and 500 $min^{-1}$ (dissolver drive). Then the catalyst was added and the batch was homogenized for 15 minutes under an $N_2$ atmosphere with the same planetary and dissolver drive speeds. Thereafter the stabilizer and the silica were incorporated, again at the same speeds. As soon as the silica was fully wetted a vacuum of approximately 200 mbar was applied and dispersion takes place for 10 minutes at 100 $min^{-1}$ of the planetary stirrer mechanism and 2000 $min^{-1}$ of the dissolver.

Immediately after the end of the dispersing operation the stirring vessel was flushed with nitrogen. Using a drum press, the sealant was dispensed as quickly as possible into aluminum tubes (cartridges).

3.2 Production of Vulcanizates From RTV-1K

In order to examine the performance properties of RTV-1K silicone sealants in which the silicas of the present invention were used it was necessary to produce vulcanizates from the sealants prepared above. These vulcanizates were processed into test specimens. For this purpose, first of all the silicone sealant was applied to a smooth support plate in a sufficient

TABLE 1

| Product | | Example 1 | Example 2 | Comparative Example 1 | Comparative Example 2 |
|---|---|---|---|---|---|
| BET | $m^2/g$ | 166 | 142 | 167 | 170 |
| CTAB | $m^2/g$ | 172 | 157 | 156 | 153 |
| DBP | g/100 g | 283 | 295 | 261 | 222 |
| pH | — | 7.5 | 6.0 | 5.8 | 6.4 |
| Loss on drying | % by weight | 1.6 | 0.5 | 2.4 | 5.5 |
| Loss on ignition | % by weight | 1.6 | 0.9 | 2.5 | 4.2 |
| $SiOH_{isolated}$ absorbance ratio | | 2.43 | 3.17 | 0.80[2] | 0.33 |
| Silanol group density | $SiOH/nm^2$ | 2.573 | 1.988 | 3.823 | 3.822 |
| Modified tapped density | g/l | 46 | 21 | 72 | 97 |
| Fraction of fine particles <1 μm[1] | % | 24.8 | 66.7 | 0.0 | 0.0 |
| Type of particle distribution | | bimodal | bimodal | monomodal | monomodal |
| $d_{90}$ value of volume-based particle distribution | μm | 6.03 | 5.87 | 14.0 | 24.17 |
| Behavior with respect to water | | hydrophilic | hydrophilic | hydrophilic | hydrophilic |

Figure 3:
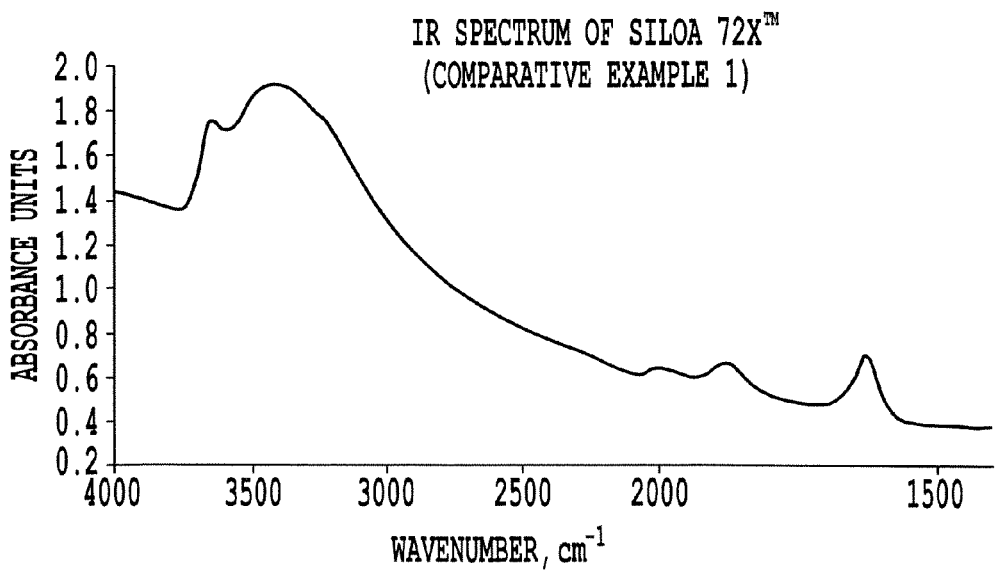
FIG. 3 is an IR spectrum of SILOA 72X™ (Comparative Example 1).

[1]with 5 minutes of ultrasound at 300 watts
[2]IR spectrum see FIG. 3

EXAMPLE 3

Performance Tests 3.1 Preparation of Acetate-crosslinking RTV-1K Silicone Sealants With Precipitated Silicas The amounts required for preparing the formulation below were indicated in Table 2. In the course of preparation, cooling with mains water should be carried out so that the formulation does not undergo warming substantially beyond room amount and was coated with a coating bar (slot height: 2 mm) to form a strip 2 mm in height, approximately 80 mm in width and with a length of approximately 300 mm. Care should be taken to ensure that no air bubbles were formed. The shapes needed for the respective test were then punched out from this silicone strip. The support plate ought to be made from polypropylene, polyethylene, Teflon or another plastic from which the vulcanized sealant was readily detachable.

The silicone strips were stored for 7 days for complete curing and then for at least 2 days under standard conditions (23° C., 50% relative humidity).

TABLE 2

Formulation for preparing a one-component room-temperature vulcanizing (RTV-1K) silicone sealant (acetoxy system)

| Formulation constituent [general name] | Chemical identification | Product name and manufacturer | Crosslinker 42 g Filling level 12% $SiO_2$ | | Crosslinker 30 g Filling level 12% $SiO_2$ | |
|---|---|---|---|---|---|---|
| | | | Initial mass [g] | Fraction [%] | Initial mass | Fraction |
| Silicone polymer OH-terminated silicone polymer (viscosity = 50 000 mPa * s) | α,ω-hydroxydimethylsiloxy-polydimethylsiloxane | Silopren ® E 50 GE Bayer Silicones GmbH & Co. KG | 468.00 | 58.6 | 468.00 | 59.5 |
| Plasticizer Non-functional polydimethylsiloxane (silicone oil, viscosity = 1000 mPa * s | α,ω-trimethylsiloxypoly-dimethylsiloxane | Oil M 1000 GE Bayer Silicones GmbH & Co. KG | 184.50 | 23.1 | 184.50 | 23.5 |
| Active filler Silica | Precipitated silica | Silica of Example 1 or 2 or Comparative Examples 1 or 2 | 95.79 | 11.999 | 95.79 | 12.2 |
| Crosslinker | Ethyltriacetoxysilane | Ethyltriacetoxysilane ABCR GmbH & Co. KG | 42.00 | 5.3 | 30.00 | 3.8 |
| Stabilizer | | TP 3556 GE Bayer Silicones GmbH & Co. KG, | 8.00 | 1.0 | 8.00 | 1.0 |
| Catalyst | dibutyltindiacetate | TEGOKAT 233 Goldschmidt TIB GmbH | 7 drops 0.01 g | 0.001 | 7 drops 0.01 g | 0.001 |
| Total amounts | | | 798.3 | 100 | 786.3 | 100 |

3.3 Determining the Rheological Properties and the Storage Stability of RTV-1K Sealants The sealants prepared in accordance with Example 3, section 1, "Preparation of Acetate-Crosslinking RTV-1K Silicone Sealants with Precipitated Silicas" were stored prior to testing for at least 24 hours in a controlled-climate chamber at 23° C./50% relative humidity.

To test the storage stability of the sealants, two tubes were stored for 35 days in a controlled-climate chamber at 23° C. at 50% relative humidity and were tested after storage periods respectively of 1, 7, 14, 21, 28 and 35 days. Additionally, two further tubes were stored in a forced-air oven at 50° C. for 35 days and likewise tested after 1, 7, 14, 21, 28 and 35 days of storage.

The rheological properties were determined using a Haake RheoStress 1 rheometer (controlled via PC using the RheoWin Pro program). The operation of the instrument and of the software was described in detail in the Haake operating instructions. For the measurement it was necessary to use a die having a diameter of 35 mm, and the measuring-plate attachment MPC 35. Measurement was conducted under the following conditions:

| | |
|---|---|
| Slot distance between die and measuring-plate attachment: | 0.5 mm |
| Measurement temperature: | 23° C. |
| Measurement range (shear rate) | 0-10 l/s |
| Number of measurement points: | 400 |

The measurement points were plotted in a diagram which shows the shear rate γ on the x axis and the shear stress τ on the y axis. At a shear rate of 10 l/s the shear stress was read off and from this figure the viscosity η at 10 l/s was calculated using η=τ/γ. Two tubes were measured, with at least three measurements being carried out per tube. From the six individual results the highest and lowest values were discarded. The remaining four results were used to calculate the average value.

For the determination of the yield point the Casson model was used. The data basis for calculating the Casson flow curve was the range from 0.2 to 2 l/s from the shear rate/shear stress diagram. The following relationship was defined:

$$\tau = f\left(\overset{\circ}{\gamma}\right)$$

The value on the y axis, at which it intersects the flow curve calculated by the method of Casson was reported as the Casson yield point.

The determination both of the viscosity at 10 l/s and of the Casson yield point was made automatically under the conditions indicated above by the RheoWin Pro software.

3.4 Determining the Tensile Strength and the Breaking Extension of Vulcanized Silicone Rubber This determination was made by a method based on DIN 53504 and was used to determine the tensile strength and the breaking elongation of specimens of defined shape made from elastomers, when the specimens were extended at a constant speed until they rupture. The tensile strength and the breaking extension in this case were defined as follows:

The tensile strength δmax was the ratio of the measured maximum force Fmax to the initial cross-section A 0 of the specimen.

The breaking elongation εR was the ratio of the length change L Δ measured at the moment of rupture to the original measurement length L 0 of the specimen.

Measurement was carried out on a tensile testing machine (Zwick/Roell, type Z010), ensuring that the preselected maximum force was variable, that the clamping device holds the test specimen firmly without mechanical damage even at high stretch, and holds the centre piece of the test specimen at the set measurement length L 0, without mechanical damage, even at high stretch, and that the spring pressure on the clamping jaws of the fine extension gauge was adjustable.

Figures 4A, 4B:
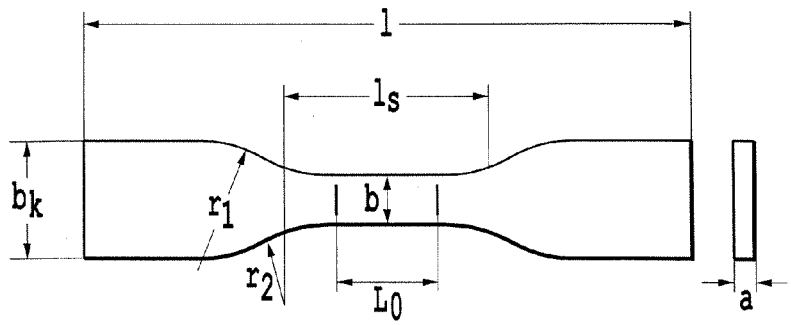
FIG. 4A shows the shape of standard dumbbells used.
FIG. 4B shows the dimensions of standard dumbbells used.

The standard dumbbells S 1 described in FIG. 4A with dimensions shown in FIG. 4B were to be used.

The corresponding test specimens were punched from the vulcanized strip 2 mm thick using a punching iron for S 1 standard dumbbells, and these test specimens were stored for at least 24 h under standard conditions (23° C., 50% relative humidity) before testing. 4-6 specimens were to be tested at a temperature of (23±2)° C. Prior to the tensile test, a measurement should be made of the thickness d and the width b of the specimens. On clamping, the standard dumbbells should be clamped in centrally between the two clamping jaws. The distance between the clamping jaws was L=50 mm. The fine extension gauge should be set to a measurement length L 0 of 25 mm and should be fixed centrally between the clamping jaws. The displays should stand at zero. The rate of advance of the pulling bracket was v=500 mm/min. The force Fmax and the length change L Δ at rupture were recorded. From these figures the tensile strength and breaking extension were calculated as shown below and were reported as the average value of the individual measurements:

$$\text{Tensile strength } \delta_{max} = \frac{F_{max}}{A_0}$$

where
$\delta_{max}$=tensile strength in [MPa] or in [N/mm$^2$]
$F_{max}$=maximum force in [N]
$A_0$=initial cross section (a*b) in [mm$^2$]

$$\text{Breaking extension } \varepsilon_R = \frac{L_\Delta}{L_0} * 100$$

where
$\varepsilon_R$=breaking extension in [%]
$L_\Delta$=length change in [mm]
$L_0$=initial length in [mm]

3.5 Determining the Tear Propagation Resistance of Vulcanized Silicone Rubber

This determination was carried out by a method based on ASTM D 624 B. The tear propagation test on elastomers was used to determine the resistance presented by an incised sample to the continuation of a tear.

The tear propagation resistance of an elastomer was dependent on its formulating constituents and on its processing, on the vulcanization, and on the testing speed. The effect tested was the influence of the reinforcing filler on the tear propagation resistance of the vulcanizates. The measurement was carried out on a tensile testing machine (from Zwick/Roell, type Z010), ensuring that the preselected maximum force was variable and that the clamping device holds the test specimen firmly, without mechanical damage, even at high extension.

Figures 5A, 5B:
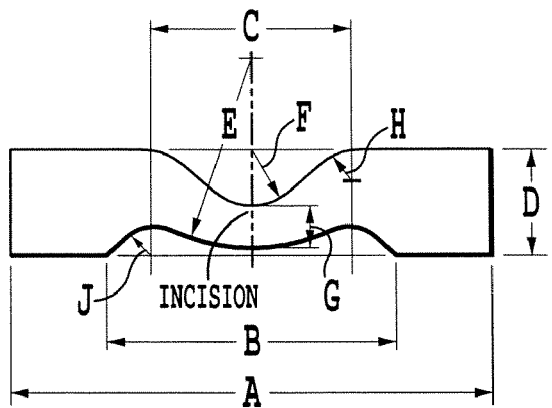
FIG. 5A shows the shape of a test specimen.
FIG. 5B shows the dimensions of a test specimen.

Test specimens (FIGS. 5A and 5B) were cut from the vulcanized silicone strips 2 mm thick, using a punching iron compliant with ASTM D 624 B and were stored for at least 24 h under standard conditions (23° C., 50% relative humidity) before testing.

At the vertex of the inside radius, the punching iron had a blade with which a slot 0.5 mm±0.05 mm in depth was incised at this point in the course of punching.

4-6 specimens should be tested, at a temperature of (23±2)° C. The specimens must be stored at the test temperature for 3 hours prior to testing. The thickness a of the specimens should be determined to ±0.01 mm prior to testing, using a thickness gauge. The sample was clamped into the clamping brackets of the tensile testing machine and ruptured at a rate of advance of v=500 mm/min, ensuring that the slot was on the left-hand side from the tester.

The two test specimens with the highest and lowest values were disregarded for the evaluation. The tear propagation resistance δw1 in [N/mm] was calculated from the variables Fmax1 (maximum force in [N]) and also al (thickness in [mm]) and was reported as the average value of the remaining individual measurements:

$$\text{Tear propagation resistance } \delta_{w1} = \frac{F_{max1}}{a_1}$$

3.6 Assessing the Results

The consistency of silicone rubber formulations into which the silicas of the present invention have been incorporated was assessed using the measurement results for the Casson yield point and for the viscosity at a shear rate of 1/10 (Table 3).

By consistency was meant the theological behavior of an RTV-1K silicone sealant. Consistency was said to be good if silicone rubber applied to a vertical surface adheres to that surface without running over 24 h in the course of curing. Adequate consistency can be recognized from a viscosity of ≧100 Pas and a yield point of ≧90 Pa. The values for the Casson yield point for the silicone rubber formulations of Examples 3a to 3d clearly show that the yield point of silicone rubber formulation comprising the silica of Example 1 (present invention), with a figure of 100 Pas, was much higher than in the case of the formulations with the comparison silicas. In the case of the silicone rubber formulation 3b with the silica of Example 2 (present invention), with a Casson yield point of 260, this effect was very much more pronounced. In other words, silicone rubber formulations into which the silicas of the present invention have been incorporated have a better consistency on the basis of the particular properties of the silicas of the present invention. Formulations of this kind remain in the form in which they have been applied without showing any tendency to run. This was also confirmed by the viscosity values. Thus, the silicas of the present invention display equal or in Example 2 markedly improved, i.e. higher viscosity than the comparative examples.

The mechanical stability (tensile strength and tear propagation resistance) and also the flexibility (breaking extension) of the cured silicone rubber formulations 3a to 3d can be assessed through their behavior under tensile load under different conditions (Table 4).

The results of measurement for the mechanical properties can be interpreted as follows: for the silicone rubber formulation 3d containing the silica of comparative example 2 it was not possible at all to produce silicone vulcanizates (complete curing directly after preparation), and accordingly it was not possible to measure the mechanical properties. The measurements for the silica of the present invention show that the minimum requirements concerning the mechanical stability (tensile strength and tear propagation resistance) and also the flexibility (breaking extension) of the cured silicone rubber formulations were met. In comparison to comparative Example 1 (silicone rubber formulation 3c), the silicas of Examples 1 and 2 in the silicone rubber formulations 3a and 3b leads to better mechanical stability (higher values for tensile strength and tear propagation resistance) and also the same or better flexibility (equal or higher values for breaking extension).

The storage stability, i.e. the change in theological properties such as yield point and viscosity and also the negative cure behavior in the tube over time, was shown in Tables 5 and 6. Consideration was given here both to the storage at room temperature and to the storage at elevated temperature (50° C.). It was clearly apparent that the silicone rubber formulations 3a and 3b with the silicas of Examples 1 and 2 undergo no change, or no substantial change, in their theological properties, viscosity of ⅒ shear rate and Casson yield point over the storage period under investigation (namely 35 days). In other words, the effective thickening and processing properties (such as extrudability, for example) were still present even after storage under the stated conditions, without the sealant having undergone preliminary crosslinking or full vulcanization while still in the tube.

In contrast, for Comparative Example 1, a negative change in the theological properties was observed within the first 21 days. In comparison to the initial values, the viscosity and yield point increase significantly, which points to premature crosslinking of the sealant. Between day 21 and day 28, the sample cures while still in the tube, and hence was no longer processable. The situation was similar after storage at elevated temperature. There, the premature curing of Comparative Example 1 occurs as early as between day 2 and day 7. Even worse was the precipitated silica Ultrasil® VN 3. Here, the silicone rubber had cured immediately after preparation and can no longer even be dispensed into the cartridge (tube) and this silicone rubber compound was not suitable for RTV-1K applications.

TABLE 3

| Example | Silica used from | Loading [% by weight] | Crosslinker content [g] | Stabilizer GE TP 3556 [g] | Casson Yield Point [Pa] | Viscosity at 10 1/s [Pa * s] |
|---|---|---|---|---|---|---|
| 3a | Example 1 | 12 | 42.0 | 8.0 | 103 | 100 |
| 3b | Example 2 | 12 | 42.0 | 8.0 | 260 | 118 |
| 3c | Comparative Example 1 | 12 | 42.0 | 8.0 | 13 | 102 |
| 3d | Comparative Example 2 | 12 | 42.0 | 8.0 | / | / |

TABLE 4

| Example | Silica used from | Loading [% by weight] | Tensile strength [N/mm$^2$] | Tear propagation resistance [N/mm] | Breaking extension [%] |
|---|---|---|---|---|---|
| 3a | Example 1 | 12 | 2.7 | 13 | 545 |
| 3b | Example 2 | 12 | 3.2 | 12 | 622 |
| 3c | Comparative Example 1 | 12 | 2.5 | 11 | 590 |
| 3d | Comparative Example 2 | 12 | — | — | — |

TABLE 5

Rheology over 35 days at RT

| Example | Silica used from | Loading in [% by weight] | Crosslinker content in [g] | Temp. in [° C.] | Period in [d] | Visc. at 10 1/s in [Pa * s] | Casson Yield Point in [Pa] |
|---|---|---|---|---|---|---|---|
| 3a | Example 1 | 12 | 42 | 23 | 0 | 100 | 103 |
|  |  |  |  |  | 35 | 104 | 99 |
| 3b | Example 2 | 12 | 42 | 23 | 0 | 118 | 260 |
|  |  |  |  |  | 35 | 124 | 270 |
| 3c | Comparative Example 1 | 12 | 42 | 23 | 0 | 102 | 13 |
|  |  |  |  |  | 21 | 173 | 77 |
|  |  |  |  |  |  | Preliminary crosslinking in the tube from day 22-28 | |
| 3c | Comparative Example 2 | 12 | 42 | 23 | 0 | Completely crosslinked directly after preparation | |

TABLE 6

Rheology over 35 days at 50° C.

| Example | Silica used from | Loading in [% by weight] | Crosslinker content in [g] | Temp. in [° C.] | Period in [d] | Visc. at 10 1/s in [Pa * s] | Casson Yield Point in [Pa] |
|---|---|---|---|---|---|---|---|
| 3a | Example 1 | 12 | 42 | 50 | 0 | 96 | 94 |
|  |  |  |  |  | 35 | 109 | 123 |
| 3b | Example 2 | 12 | 42 | 50 | 0 | 113 | 252 |
|  |  |  |  |  | 35 | 112 | 279 |
| 3c | Comparative Example 1 | 12 | 42 | 50 | 0 | 218 | 96 |
|  |  |  |  |  |  | Preliminary crosslinking in the tube from day 2-7 | |
| 3d | Comparative Example 2 | 12 | 42 | 50 | 0 | Completely crosslinked directly after preparation | |

German patent applications DE 102006024591.1 filed May 26, 2006, DE 102007004757.8, filed Jan. 31, 2007 and DE 102006048850.4, filed Oct. 16, 2006, are incorporated herein by reference.

Numerous modifications and variations on the present invention are possible in light of the above teachings. It is therefore to be understood that within the scope of the appended claims, the present invention may be practiced otherwise than as specifically described herein.

The invention claimed is:

1. A precipitated silica having an $SiOH_{isolated}$ absorbance ratio of greater than or equal to 1.

2. The precipitated silica according to claim 1, wherein a silanol group density is 0.5 to 3.5 $SiOH/nm^2$.

3. The precipitated silica according to claim 1, wherein a modified tapped density is less than or equal to 70 g/l.

4. The precipitated silica according to claim 1, having the following properties:
 a BET surface area of 50-600 $m^2/g$,
 a CTAB surface area of 50-350 $m^2/g$, and
 a DBP (anhydrous) of 150-400 g/100 g.

5. The precipitated silica according to claim 1, wherein 5% to 100% of particles in a volume-based particle distribution curve are <1 µm.

6. The precipitated silica according to claim 1, having a d90 value of not greater than 0.001-10 µm.

7. The precipitated silica according to claim 1, having a bimodal volume-based particle distribution curve.

8. The precipitated silica according to claim 1, having a loss on ignition of 0.1%-3.0% by weight.

9. The precipitated silica according to claim 1, having a loss on drying of 0.1%-3.0% by weight.

10. The precipitated silica according to claim 1, having a pH of 4-8.

11. The precipitated silica according to claim 1, which is a hydrophilic precipitated silica.

12. A process for preparing a silica according to claim 1, comprising:
 A) reacting at least one silicate with at least one acidifier, to obtain a silica,
 B) filtering and washing the silica, to obtain a washed silica or filter cake,
 C) drying the washed silica or filter cake, to obtain a dried silica, and
 D) heat-treating the dried silica.

13. The process according to claim 12, wherein step A comprises the following substeps:
 Aa preparing an initial charge of i) water or of ii) water and at least one silicate and/or a silicate solution,
 Ab metering i) at least one silicate and/or a silicate solution and ii) at least one acidifier into the initial charge from substep Aa) with stirring at 80 to 100° C. until the solids content of an obtained precipitation suspension reaches a level which leads to the solids content which is to be reached in substep Ac).
 Ac adding an acidifier at a temperature of the precipitation suspension of 80 to 100° C., so that the pH of the precipitation suspension is lowered to 2 to 6 and the solids content of the precipitation suspension at the end of this substep is between 30 and 70 g/l.

14. The process according to claim 13, wherein in substep Aa) the pH of the initial charge is between 5 and 10 and the temperature of the initial charge is between 80 and 100° C.

15. The process according to claim 13, wherein for the period of substep Ab) the pH is held constantly at a level between 7 and 10.

16. The process according to claim 12, wherein the silica is ground in a step Ca, i.e. between steps C and D, or in a step E, i.e. after step D, or both in step Ca, i.e. between steps C and D, and in step E, i.e. after step D.

17. The process according to claim 16, wherein the grinding parameters are selected such that the ground product in the range <1 µm of the volume-based particle distribution has a fine-particle fraction of 5% to 100% and/or a d90 value in the volume-based particle distribution curve of between 0.001 and 10 µm.

18. The process according to claim 16, wherein grinding is carried out using a jet mill, preferably a fluid-bed opposed-jet mill.

19. The process according to claim 18, wherein the fluid-bed opposed-jet mill is operated with steam as operational medium.

20. The process according to claim 16, wherein grinding is carried out by using a grinding apparatus;
 wherein in the grinding phase the grinding apparatus is operated with an operational medium selected from the group consisting of gas, vapor, and mixtures thereof; and
 wherein in a heating phase, i.e. before the actual operation with the operational medium, a grinding chamber of said grinding apparatus is heated such that the temperature in the grinding chamber and/or at a grinding apparatus outlet is higher than the dew point of the operational medium.

21. The process according to claim 16, wherein grinding is carried out by using a grinding system comprising a jet mill;
 wherein in the grinding phase the mill is operated with an operational medium selected from the group consisting of gas, vapor, and mixtures thereof; and wherein in a heating phase, i.e. before the actual operation with the operational medium, a grinding chamber is heated such that the temperature in the grinding chamber and/or at a mill outlet is higher than the dew point of the operational medium.

22. The process according to claim 20, wherein said operational medium is steam, a gas comprising steam, or a mixture thereof.

23. The process according to claim 12, wherein the heat treatment of the silica in step D is carried out in a fluidized-bed, fluid-bed or rotary-tube reactor.

24. The process according to claim 23, wherein a fluidized-bed reactor is used and the following substeps are carried out:
Da introducing the silica into the fluidized-bed reactor,
Db preheating the reactor to 300 to 800° C., the reactor being traversed at the same time by a flow of inert gas and/or nitrogen/air mixture in such a way as to produce a fluidization velocity of 0.02 to 0.06 m/s,
Dc feeding in a gas mixture I comprising steam and an inert gas, or a gas mixture II comprising steam, an inert gas and air, at 300 to 800° C. for a period of 0.25 to 6 h, the gas mixture traversing the reactor with a fluidization velocity of 0.02 to 0.06 m/s, and the gas mixtures I and II having a steam concentration of 10 to 95% by volume and in the case of gas mixture II an oxygen content of 0.01% to 21% by volume,
Dd interrupting the addition of steam and expelling the steam using an inert gas, nitrogen for example, and/or of an inert gas/air mixture at 300 to 800° C., the gas or gas mixture traversing the reactor with a fluidization velocity of 0.02 to 0.06 m/s, and, if using an inert gas/air mixture, said mixture having an oxygen content of 0.01% to 21% by volume, and
De cooling the heat-treated silica to room temperature in a dry process atmosphere, and, if using an inert gas/air mixture, said mixture having an oxygen content of 0.01% to 21% by volume.

25. The process silica wherein it is obtainable by the process according to claim 12.

26. A method of producing a sealant, comprising:
adding the precipitated silica according to claim 1 to a sealant.

27. The method according to claim 26, wherein the sealant is RTV-1K silicone rubber or a silicone sealant of a crosslinking system selected from the group consisting of an acetoxy-crosslinking system, an alkoxy-crosslinking system, an oxime-crosslinking system and mixtures thereof.

28. A sealant, comprising:
at least one precipitated silica according to claim 1.

29. The sealant according to claim 28, which is RTV-1K silicone rubber or a silicone sealant of a crosslinking system selected from the group consisting of an acetoxy-crosslinking system, an alkoxy-crosslinking system, an oxime-crosslinking system and mixtures thereof.

30. The sealant according to claim 28, which is a joint-sealant in the building industry, an adhesive or sealant in the automotive industry, or as a coating material for textile fabric.

* * * * *

UNITED STATES PATENT AND TRADEMARK OFFICE
CERTIFICATE OF CORRECTION

| | | |
|---|---|---|
| PATENT NO. | : 7,767,180 B2 | Page 1 of 1 |
| APPLICATION NO. | : 11/754930 | |
| DATED | : August 3, 2010 | |
| INVENTOR(S) | : Christian Panz et al. | |

It is certified that error appears in the above-identified patent and that said Letters Patent is hereby corrected as shown below:

On the title page, Item (73), the Assignee information is incorrect. Item (73) should read:

-- (73)  Assignee: Evonik Degussa GmbH, Essen (DE) --

Signed and Sealed this

Twenty-third Day of November, 2010

David J. Kappos
*Director of the United States Patent and Trademark Office*